US012638725B2

(12) United States Patent
Wan et al.

(10) Patent No.: US 12,638,725 B2
(45) Date of Patent: May 26, 2026

(54) DISPLAY SUBSTRATE, DISPLAY PANEL AND DISPLAY APPARATUS

(71) Applicants: Chongqing BOE Optoelectronics Technology Co., Ltd., Chongqing (CN); BOE Technology Group Co., Ltd., Beijing (CN)

(72) Inventors: Bin Wan, Beijing (CN); Xiaoyuan Wang, Beijing (CN); Hui Guo, Beijing (CN); Chen Xu, Beijing (CN); Guodong Yang, Beijing (CN); Junming Chen, Beijing (CN); Yan Liu, Beijing (CN); Xun Pu, Beijing (CN); Yuanyuan Zhu, Beijing (CN); Zhongshan Wu, Beijing (CN); Dan Lei, Beijing (CN)

(73) Assignees: CHONGQING BOE OPTOELECTRONICS TECHNOLOGY CO., LTD., Chongqing (CN); BOE TECHNOLOGY GROUP CO., LTD., Beijing (CN)

( * ) Notice: Subject to any disclaimer, the term of this patent is extended or adjusted under 35 U.S.C. 154(b) by 93 days.

(21) Appl. No.: 18/292,110

(22) PCT Filed: Oct. 31, 2022

(86) PCT No.: PCT/CN2022/128700
§ 371 (c)(1),
(2) Date: Jan. 25, 2024

(87) PCT Pub. No.: WO2024/092429
PCT Pub. Date: May 10, 2024

(65) Prior Publication Data
US 2025/0093705 A1     Mar. 20, 2025

(51) Int. Cl.
*G02F 1/1339*     (2006.01)
*G02F 1/1333*     (2006.01)
(Continued)

(52) U.S. Cl.
CPC ...... *G02F 1/1339* (2013.01); *G02F 1/133357* (2021.01); *G02F 1/1345* (2013.01); *G09G 3/3648* (2013.01)

(58) Field of Classification Search
CPC ............. G02F 1/1339; G02F 1/133357; G02F 1/1345; G09G 3/3648
(Continued)

(56) References Cited

U.S. PATENT DOCUMENTS 11,049,436 B1     6/2021  Shin et al.
2018/0046012 A1*  2/2018  Miyamoto .......... G02F 1/13439

FOREIGN PATENT DOCUMENTS

CN          1773334 A      5/2006
CN        105679967 A      6/2016
(Continued)

*Primary Examiner* — David Y Chung
(74) *Attorney, Agent, or Firm* — Nath, Goldberg & Meyer; Joshua B. Goldberg

(57)          ABSTRACT
A display substrate is provided to include: a first base substrate including a sealing region and a display port region, wherein at least one first connection region and at least one second connection region are in the display port region, a first overlapping region is formed between the second and first connection regions; first and second connection terminals in the first and second connection regions, respectively; and a planarization layer including at least one first trench and at least one second trench corresponding to the first and second connection regions therein, respectively; orthographic projections of bottoms of first and second trenches on the first base substrate cover corresponding first and second connection regions, respectively; the planarization layer includes: a first pattern corresponding to the first
(Continued)

overlapping region; orthographic projections of the first pattern and its corresponding first overlapping region on the first base substrate overlap with each other.

19 Claims, 12 Drawing Sheets

(51) Int. Cl.
*G02F 1/1345* (2006.01)
*G09G 3/36* (2006.01)

(58) Field of Classification Search
USPC .................................................. 349/149–152
See application file for complete search history.

(56) References Cited

FOREIGN PATENT DOCUMENTS

| | | |
|---|---|---|
| CN | 106339660 A | 1/2017 |
| CN | 106483717 A | 3/2017 |
| CN | 110556407 A | 12/2019 |
| CN | 110970484 A | 4/2020 |
| CN | 113594204 A | 11/2021 |
| CN | 113937236 A | 1/2022 |
| CN | 114698232 A | 7/2022 |
| CN | 217562567 U | 10/2022 |
| WO | 2022198650 A1 | 9/2022 |

\* cited by examiner

DISPLAY SUBSTRATE, DISPLAY PANEL AND DISPLAY APPARATUS

This is a National Phase Application filed under 35 U.S.C. 371 as a national stage of PCT/CN2022/128700, filed Oct. 31, 2022, the contents of which are hereby incorporated by reference in its entirety.

TECHNICAL FIELD

The present disclosure relates to the field of display technology, and in particular to a display substrate, a display panel and a display apparatus.

BACKGROUND

With the development of information technology, electronic devices are widely used in daily life. A liquid crystal display as a most widely used flat panel display occupies an important market in the display field; a liquid crystal display panel is an important structure of the liquid crystal display for displaying images, and is formed by aligning and assembling a display substrate (also called an array substrate) and an opposite substrate.

It is found in practical applications that, a display screen on the liquid crystal display panel has a display defect of yellowing at a fixed position close to a display port region of the liquid crystal display panel.

SUMMARY

The present disclosure is directed to at least one of the technical problems in the prior art, and provides a display substrate, a display panel and a display apparatus.

In a first aspect, embodiments of the present disclosure provide a display substrate, including: a first base substrate including a sealing region and a display port region along a first direction, wherein at least one first connection region and at least one second connection region on a side of the at least one first connection region away from the sealing region are in the display port region, the at least one second connection region and the at least one first connection region are arranged at intervals, a first overlapping region is formed between the at least one second connection region and the at least one first connection region, and the first overlapping region is a region between the at least one first connection region and the at least one second connection region and overlapping with the at least one first connection region and the at least one second connection region in the first direction; a plurality of first connection terminals and a plurality of second connection terminals on the first base substrate, wherein the plurality of first connection terminals are in the at least one first connection region, and the plurality of second connection terminals are in the at least one second connection region; and a planarization layer on a side of the plurality of first connection terminals and the plurality of second connection terminals away from the first base substrate, wherein at least one first trench corresponding to the at least one first connection region and at least one second trench corresponding to the at least one second connection region are provided in the planarization layer; an orthographic projection of a bottom of each first trench on the first base substrate covers a corresponding first connection region, an orthographic projection of a bottom of each second trench on the first base substrate covers a corresponding second connection region; the planarization layer includes: a first pattern corresponding to the first overlapping region; an orthographic projection of the first pattern on the first base substrate overlaps with an orthographic projection of a corresponding first overlapping region on the first base substrate.

In some embodiments, the first pattern extends along a second direction and traverses the corresponding first overlapping region in the second direction; and the second direction intersects the first direction.

In some embodiments, the at least one first trench and the at least one second trench corresponding to the at least one first connection region and the at least one second connection region with the first overlapping region therebetween are separated from each other along the first direction by the first pattern corresponding to the first overlapping region.

In some embodiments, the first overlapping region has a width in the first direction of greater than or equal to 500 μm.

In some embodiments, the first pattern has a width in the first direction of greater than or equal to 120 μm.

In some embodiments, the display substrate further includes a first separation region between the sealing region and the display port region, wherein a second overlapping region is formed between the at least one first connection region and the first separation region, and the second overlapping region is a region between the at least one first connection region and the first separation region and overlapping with both the at least one first connection region and the first separation region in the first direction; the display substrate further includes a third trench corresponding to the first separation region in the planarization layer, and an orthographic projection of a bottom of the third trench on the first base substrate covers an orthographic projection of the third trench on the first base substrate; and the planarization layer further includes: a second pattern corresponding to the second overlapping region, and an orthographic projection of the second pattern on the first base substrate overlaps with the second overlapping region.

In some embodiments, the second pattern extends along the second direction and traverses the corresponding second overlapping region in the second direction; and the second direction intersects the first direction.

In some embodiments, the at least one first trench and the third trench corresponding to the at least one first connection region and the first separation region with the second overlapping region therebetween are separated from each other by the second pattern corresponding to the second overlapping region.

In some embodiments, the second overlapping region has a width in the first direction of greater than or equal to 400 μm.

In some embodiments, the second pattern has a width in the first direction of greater than or equal to 120 μm.

In some embodiments, the sealing region includes: a display region and a non-display region surrounding the display region, and a region where the orthographic projection of the bottom of the third trench on the first base substrate is located is a first projection region; and an edge of the first projection region close to the display region is within the non-display region.

In some embodiments, the at least one first connection region includes a plurality of first connection regions, the at least one first trench includes a plurality of first trenches, the plurality of first trenches and the plurality of first connection regions are in one-to-one correspondence with each other, the plurality of first trenches are at intervals along the second direction; and a distance between any two adjacent first trenches in the second direction is greater than or equal to 6 μm; and/or the at least one second connection region includes a plurality of second connection regions, the at least one second trench includes a plurality of second trenches, the plurality of second trenches and the plurality of second connection regions are in one-to-one correspondence with each other, the plurality of second trenches are at intervals along the second direction; and a distance between any two adjacent second trenches in the second direction is greater than or equal to 6 μm.

In some embodiments, a region where an orthographic projection of the planarization layer on the base substrate is located is a second projection region; for any one of the plurality of first connection terminals, a minimum distance from the first connection terminal to the second projection region along the first direction is greater than or equal to 50 μm; for any one of the plurality of first connection terminals, a minimum distance from the first connection terminal to the second projection region along the second direction is greater than or equal to 1500 μm; for any one of the plurality of second connection terminals, a minimum distance from the second connection terminal to the second projection region along the first direction is greater than or equal to 50 μm; and for any one of the plurality of second connection terminals, a minimum distance from the second connection terminal to the second projection region along the second direction is greater than or equal to 1500 μm.

In some embodiments, the first base substrate further includes a second separation region; the second separation region and the sealing region are arranged in the second direction; the sealing region includes: a display region and a non-display region surrounding the display region, the non-display region including: a functional region between the display region and the second separation region; the functional region includes: a driving circuit arrangement region, a driving circuit clock signal trace arrangement region, and a display signal trace arrangement region, which are sequentially arranged in the second direction and away from the display region; the driving circuit arrangement region is provided with a gate driving circuit therein, the driving circuit clock signal trace arrangement region is provided with a plurality of driving circuit clock signal traces therein, and the display signal trace arrangement region is provided with a display signal trace therein; the planarization layer is provided with a fourth trench corresponding to the second separation region therein, and an orthographic projection of the fourth trench on the first base substrate covers the second separation region; and a region where an orthographic projection of a bottom of the fourth trench on the first base substrate is located is a third orthographic projection region, and an edge of the third orthographic projection region close to the display region is between the driving circuit arrangement region and an edge of the display signal trace arrangement region close to the second separation region.

In some embodiments, the edge of the third orthographic projection region close to the display region and the driving circuit clock signal trace arrangement region do not overlap with each other.

In some embodiments, the edge of the third orthographic projection region close to the display region is in the display signal trace arrangement region.

In some embodiments, the functional region further includes: a driving circuit non-clock signal trace arrangement region; the driving circuit non-clock signal trace arrangement region is between the driving circuit clock signal trace arrangement region and the driving circuit arrangement region; and the driving circuit non-clock signal trace arrangement region is provided with driving circuit non-clock signal traces therein; and the edge of the third orthographic projection region close to the display region is in the driving circuit non-clock signal trace arrangement region.

In a second aspect, embodiments of the present disclosure further provide a display panel, including: the display substrate provided in the first aspect described above, and an opposite substrate opposite to the display substrate.

In some embodiments, the display panel further includes: a frame sealing glue between the display substrate and the opposite substrate; an outer edge of the frame sealing glue is an edge of the sealing region.

In some embodiments, the display panel further includes: post spacers on a side of the opposite substrate close to the display substrate.

In some embodiments, the first base substrate further includes a second separation region; the second separation region and the sealing region are arranged in a second direction; the sealing region includes: a display region and a non-display region surrounding the display region, the non-display region including: a functional region between the display region and the second separation region; the functional region includes: a driving circuit arrangement region, a driving circuit clock signal trace arrangement region, and a display signal trace arrangement region, which are sequentially arranged away from the display region in the second direction; the driving circuit arrangement region is provided with a gate driving circuit therein, the driving circuit clock signal trace arrangement region is provided with a plurality of driving circuit clock signal traces therein, and the display signal trace arrangement region is provided with a display signal trace therein; the planarization layer is provided with a fourth trench corresponding to the second separation region therein, and an orthographic projection of the fourth trench on the first base substrate covers the second separation region; and a region where an orthographic projection of a bottom of the fourth trench on the first base substrate is located is a third orthographic projection region, and an edge of the third orthographic projection region close to the display region is between the driving circuit arrangement region and an edge of the display signal trace arrangement region close to the second separation region; wherein the second direction intersects the first direction, the edge of the third orthographic projection region close to the display region is in the display signal trace arrangement region, and a width K1 of the fourth trench in the second direction satisfies: $K0 < K1 \leq \frac{1}{2} \times K2 + K0$, where K0 is a width, in the second direction, of the second separation region in the second direction, and K2 is a width of the frame sealing glue at a side close to the second separation region in the second direction.

In some embodiments, the first base substrate further includes a second separation region; the second separation region and the sealing region are arranged in a second direction; the sealing region includes: a display region and a non-display region surrounding the display region, the non-display region including: a functional region between the display region and the second separation region; the functional region includes: a driving circuit arrangement region, a driving circuit clock signal trace arrangement region, and a display signal trace arrangement region, which are sequentially arranged away from the display region in the second direction; the driving circuit arrangement region is provided with a gate driving circuit therein, the driving circuit clock signal trace arrangement region is provided with a plurality of driving circuit clock signal traces therein, and the display signal trace arrangement region is provided with a display signal trace therein; the planarization layer is provided with a fourth trench corresponding to the second separation region therein, and an orthographic projection of the fourth trench on the first base substrate covers the second separation region; and a region where an orthographic projection of a bottom of the fourth trench on the first base substrate is located is a third orthographic projection region, and an edge of the third orthographic projection region close to the display region is between the driving circuit arrangement region and an edge of the display signal trace arrangement region close to the second separation region; wherein the second direction intersects the first direction, wherein the functional region further includes: a driving circuit non-clock signal trace arrangement region; the driving circuit non-clock signal trace arrangement region is between the driving circuit clock signal trace arrangement region and the driving circuit arrangement region; and the driving circuit non-clock signal trace arrangement region is provided with a driving circuit non-clock signal trace therein; and the edge of the third orthographic projection region close to the display region is in the driving circuit non-clock signal trace arrangement region, and a width K1 of the fourth trench in the second direction satisfies: $K2+K0 \leq K1 \leq 1.4 \times K2+K0$, where K0 is a width of the second separation region in the second direction, and K2 is a width, in the second direction, of the frame sealing glue at a side close to the second separation region.

In a third aspect, embodiments of the present disclosure further provide a display apparatus, including: the display panel provided in the second aspect described above.

6

Figure 7:
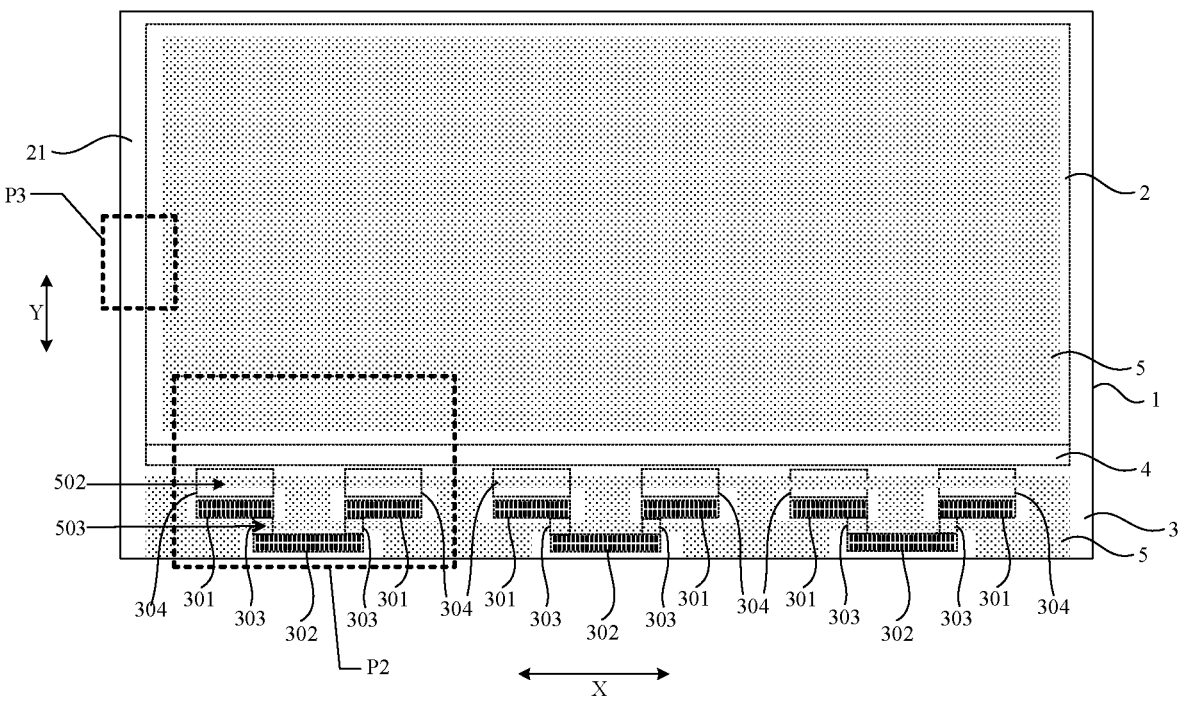
FIG. 7 is a schematic top view of a display substrate according to embodiments of the present disclosure.
Figure 10A:
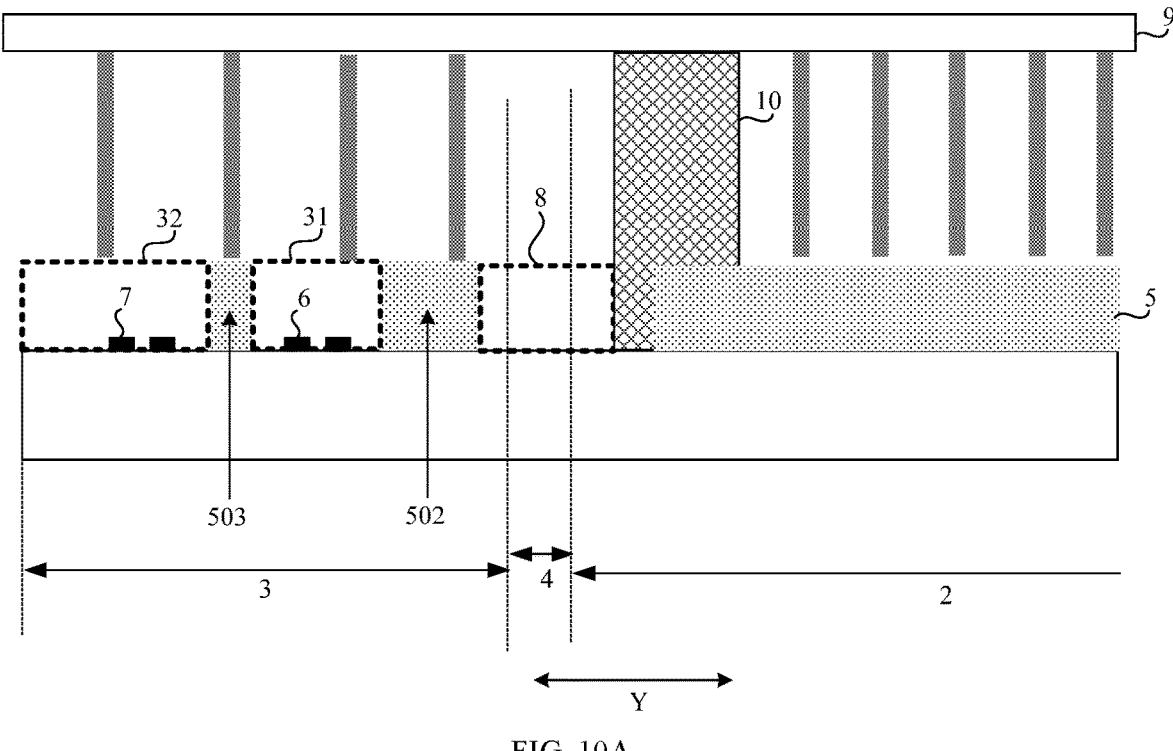
FIG. 10A is a schematic cross-sectional view illustrating that a portion of the display substrate shown in FIG. 9 and an uncut opposite substrate are opposite to each other during an aligning and assembling process.
Figure 10B:
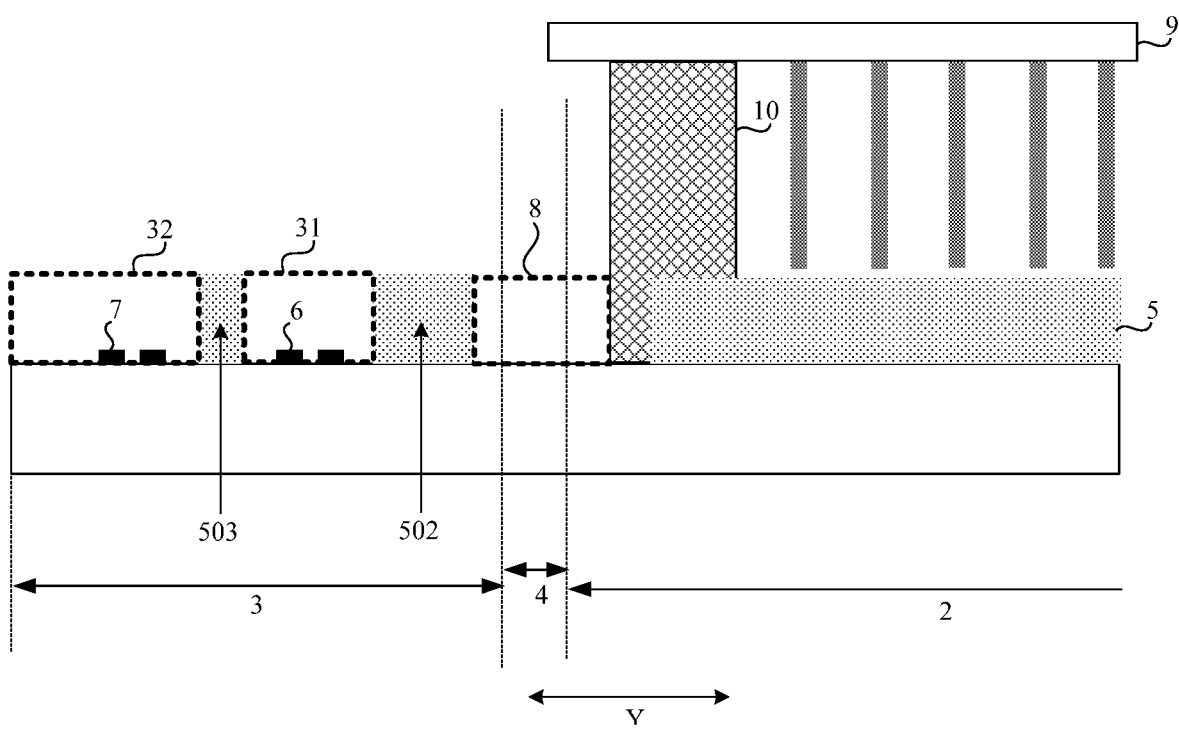
Figure 11:
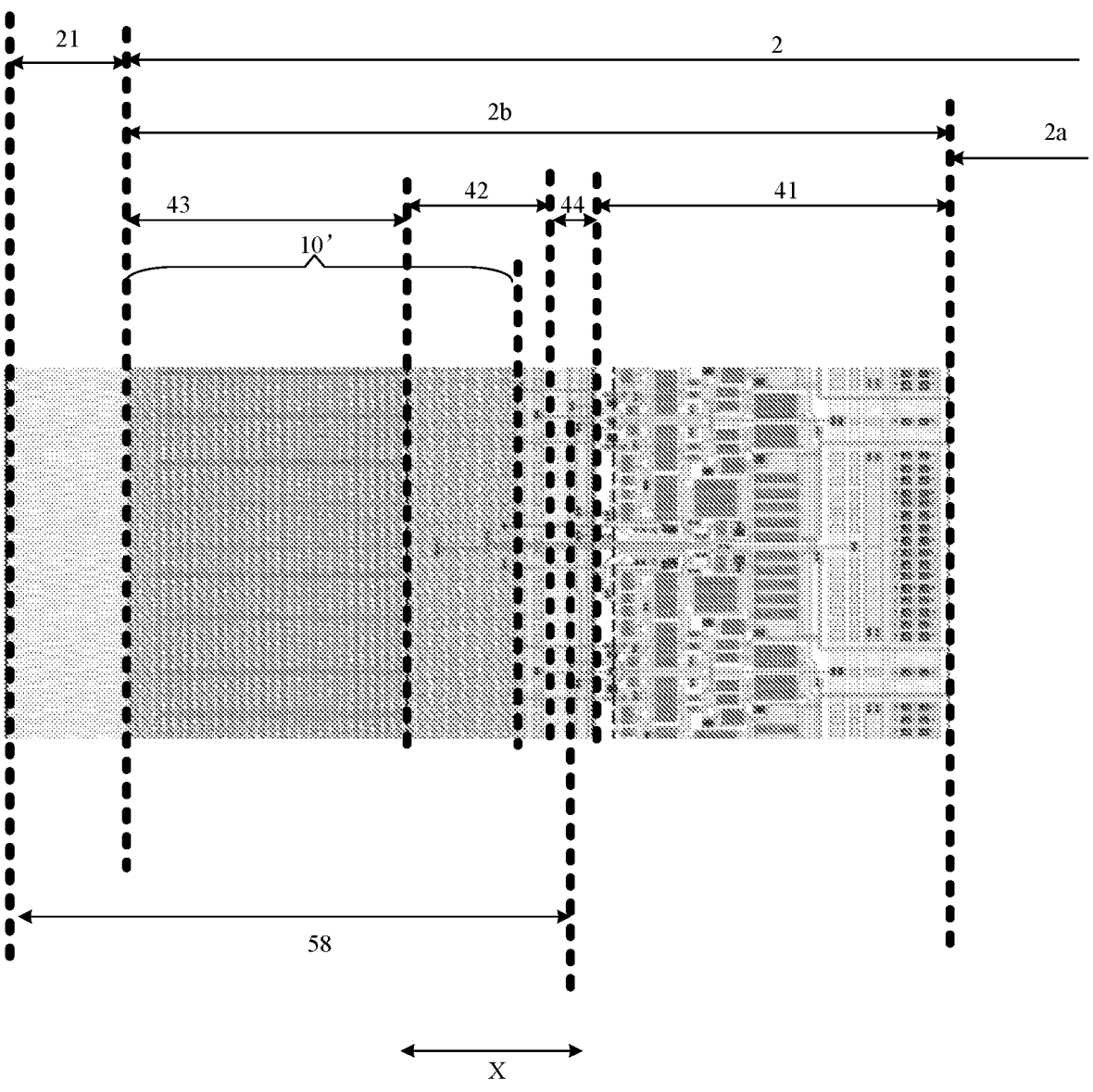
Figure 12:
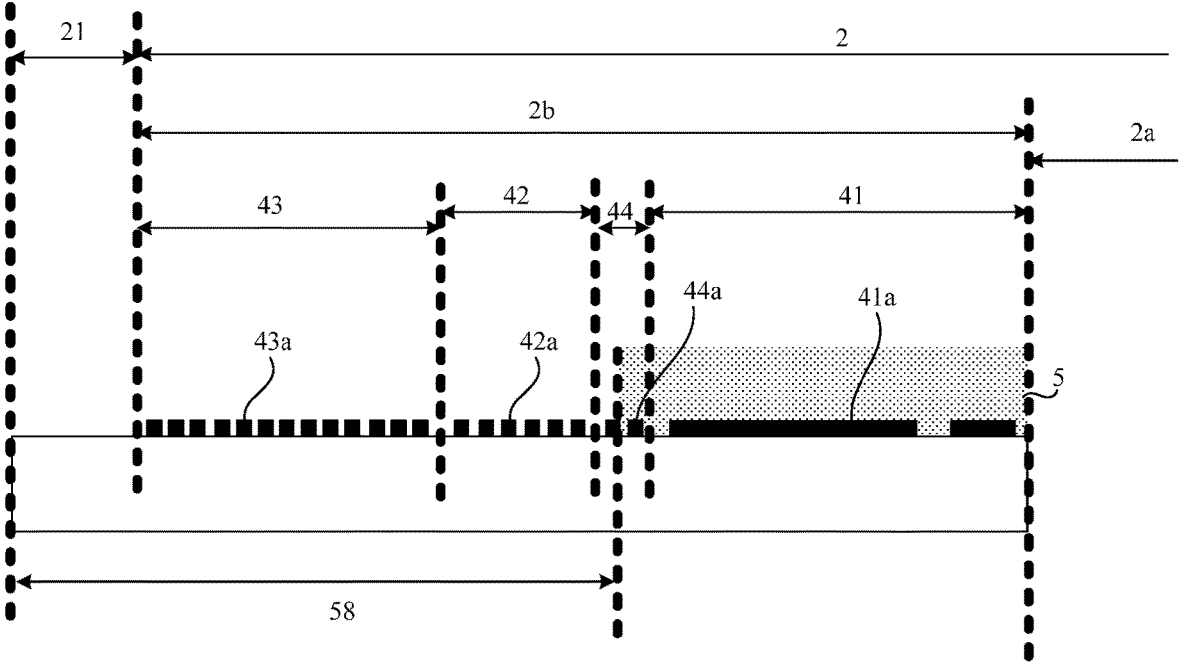
Figure 13:
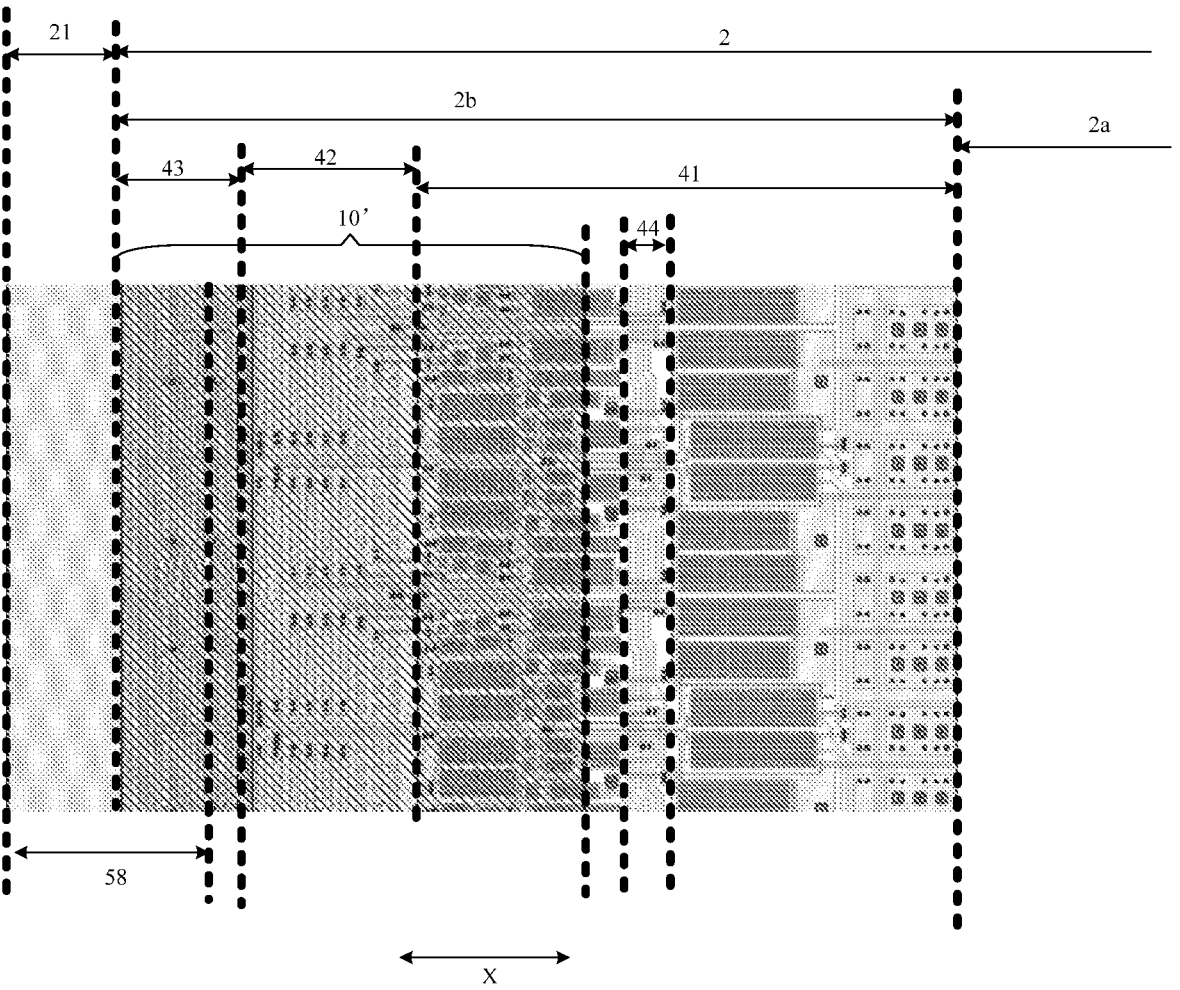
Figure 14:
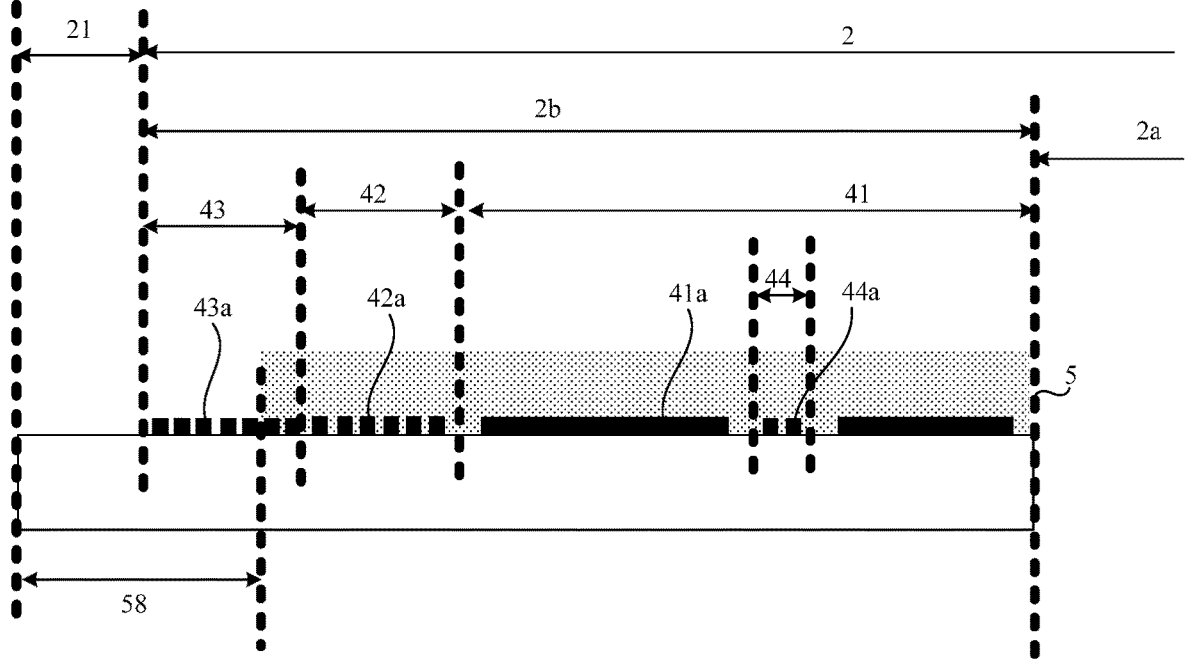
Figure 15:
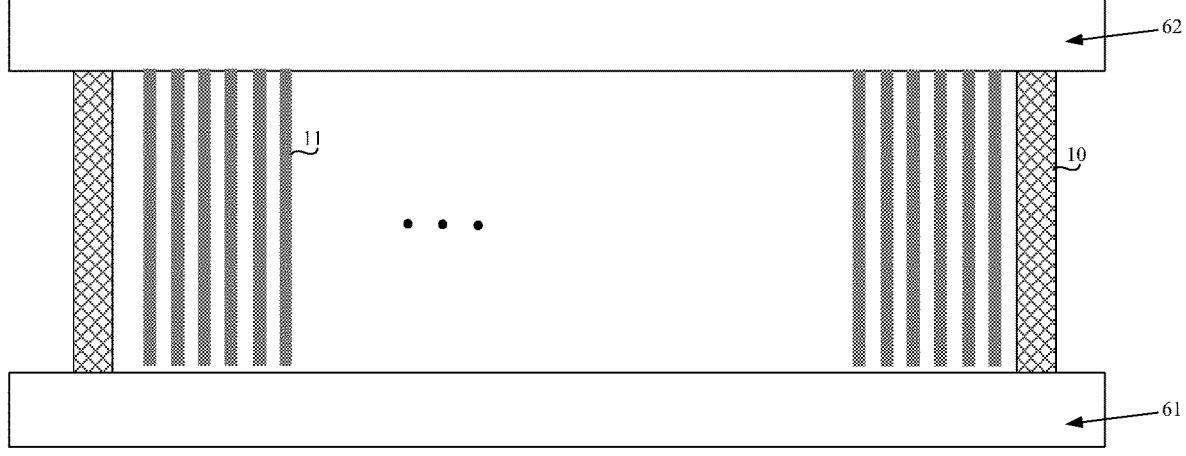

FIG. 10B is a schematic cross-sectional view illustrating the display substrate and the opposite substrate of FIG. 10A after cutting;

FIG. 11 is an enlarged view of a region P3 in FIG. 7 at a certain magnification;

FIG. 12 is a schematic cross-sectional view of a functional region and its surrounding region according to embodiments of the present disclosure;

FIG. 13 is another enlarged view of a region P3 in FIG. 7 at a certain magnification;

FIG. 14 is a schematic cross-sectional view of a functional region and its surrounding region according to embodiments of the present disclosure; and FIG. 15 is a schematic cross-sectional view of a display panel according to embodiments of the present disclosure.

DETAIL DESCRIPTION OF EMBODIMENTS

In order to enable one of ordinary skill in the art to better understand the technical solutions of the present disclosure, a display substrate, a display panel and a display apparatus provided by the present disclosure will be described in further detail with reference to the accompanying drawings.

Unless defined otherwise, technical or scientific terms used herein shall have the ordinary meaning as understood by one of ordinary skill in the art to which the present disclosure belongs. The terms "first", "second", and the like used in the present disclosure are not intended to indicate any order, quantity, or importance, but rather are used for distinguishing one element from another. Further, the term "a", "an", "the", or the like used herein does not denote a limitation of quantity, but rather denotes the presence of at least one element. The term of "comprising", "including", or the like, means that the element or item preceding the term contains the element or item listed after the term and its equivalent, but does not exclude other elements or items. The terms "upper", "lower", "left", "right", and the like are used only for indicating relative positional relationships, and when the absolute position of an object being described is changed, the relative positional relationships may also be changed accordingly. As used herein, a term "about", "approximately" or "approximately the same" includes the stated value and means that a deviation from the stated value is within an acceptable range of deviation for a particular value as determined by one of ordinary skill in the art in view of a measurement in question and an error associated with a measurement of a particular quantity (i.e., limitations of the measurement system). For example, the term "about" may mean that the deviation from the stated value is within one or more standard ranges of deviation, or within ±30%, 20%, 10%, 5% of the stated value.

In the drawings, thicknesses of layers, films, panels, regions, etc. have been exaggerated for clarity. Exemplary embodiments are described herein with reference to cross-sectional views that are schematic diagrams of idealized embodiments. As such, deviations from shapes in the drawings as a result of, for example, manufacturing techniques and/or tolerances, are to be expected. Thus, embodiments described herein should not be construed as limited to the particular shapes of regions as illustrated herein, but deviations from shapes due to, for example, manufacturing are included. For example, regions illustrated or described as being flat may typically have rough and/or nonlinear features. Further, the illustrated sharp corners may be rounded. Thus, the regions illustrated in the drawings are schematic in nature and shapes of the regions are not intended to illustrate the precise shapes of the regions and are not intended to limit the scope of the claims.

A display panel involved in the present disclosure is specifically a liquid crystal display panel, and includes: a display substrate and an opposite substrate opposite to the display substrate (the display substrate and the opposite substrate which are aligned and assembled). Generally, a size of the display substrate is larger than that of the opposite substrate, and the display substrate includes a region directly opposite to the opposite substrate, and a region beyond a coverage of the opposite substrate for fixing external chips, flexible circuit boards and the display panel; a frame sealing glue may be used for sealing and a liquid crystal layer is filled in the region of the display substrate directly opposite to the opposite substrate. A region covered by the frame sealing glue and the liquid crystal layer is a sealing region, including: a display region and a non-display region surrounding the display region. The region of the display substrate for fixing the external chips, the flexible circuit boards and the display panel is a display port (DP) region.

The display port region includes a plurality of first connection regions and a plurality of second connection regions. A plurality of first connection terminals are arranged in the first connection regions, a plurality of second connection terminals are arranged in the second connection regions. The first connection terminals may be configured to be bond and connected to chips (such as, source driving chips), and the second connection terminals may be configured to be bond and connected to flexible printed circuits (FPCs). That is, the first connection regions are IC connection regions and the second connection regions are FPC connection regions.

Generally, related processes of forming thin film transistors are completed on the display substrate, and a surface of an obtained intermediate product of the display substrate has an obvious uneven topography; if a pixel electrode or a common electrode is formed based on the surface having the obvious uneven topography, the formed pixel electrode or common electrode easily has obvious defects due to abnormal quality of films. For this reason, after the related processes of forming the thin film transistors are completed, a planarization layer is formed on the thin film transistors, and then the pixel electrode and the common electrode (if the common electrode is disposed on the display substrate) are subsequently formed based on a planarized surface (a flat surface) provided by the planarization layer.

Figure 1:
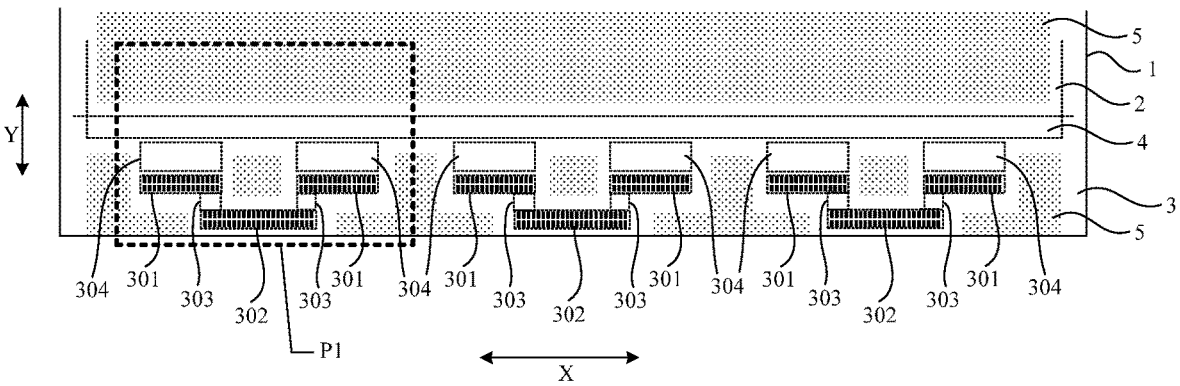
FIG. 1 is a schematic top view of a part of a display substrate in a display port region in the prior art.
Figure 2:
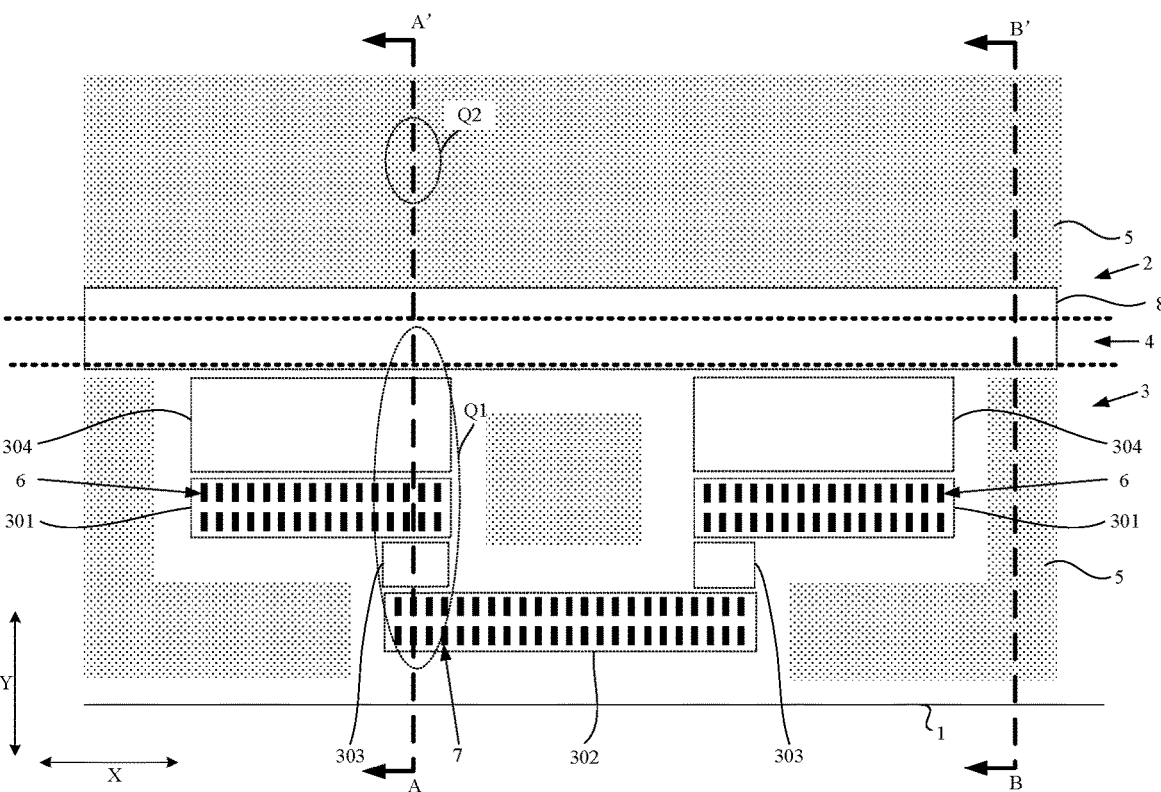
FIG. 2 is an enlarged view of a region P1 in FIG. 1 at a certain magnification.
Figure 3:
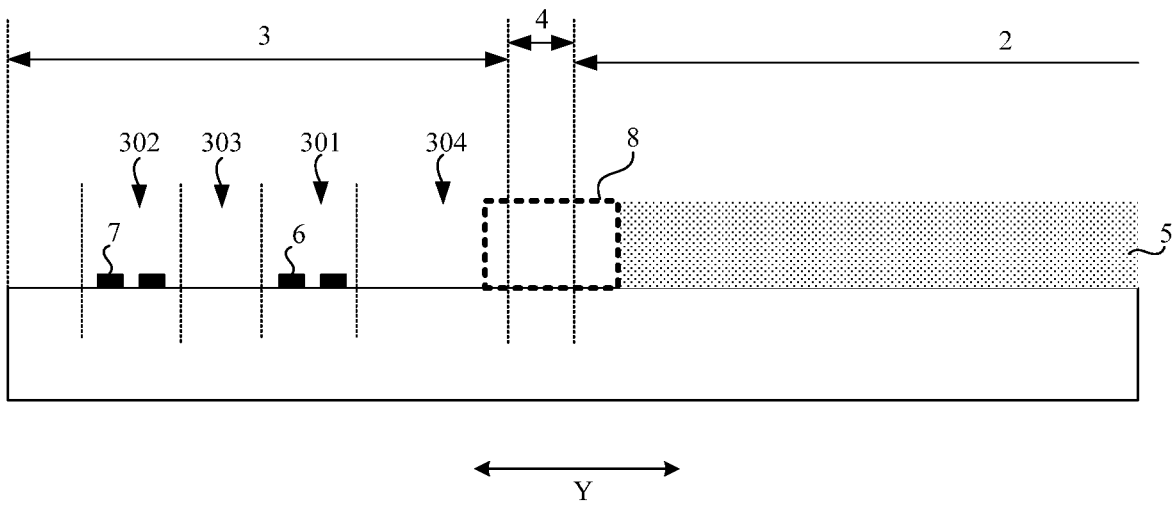
FIG. 3 is a schematic cross-sectional view taken along a line A-A' of FIG. 2.
Figure 4:
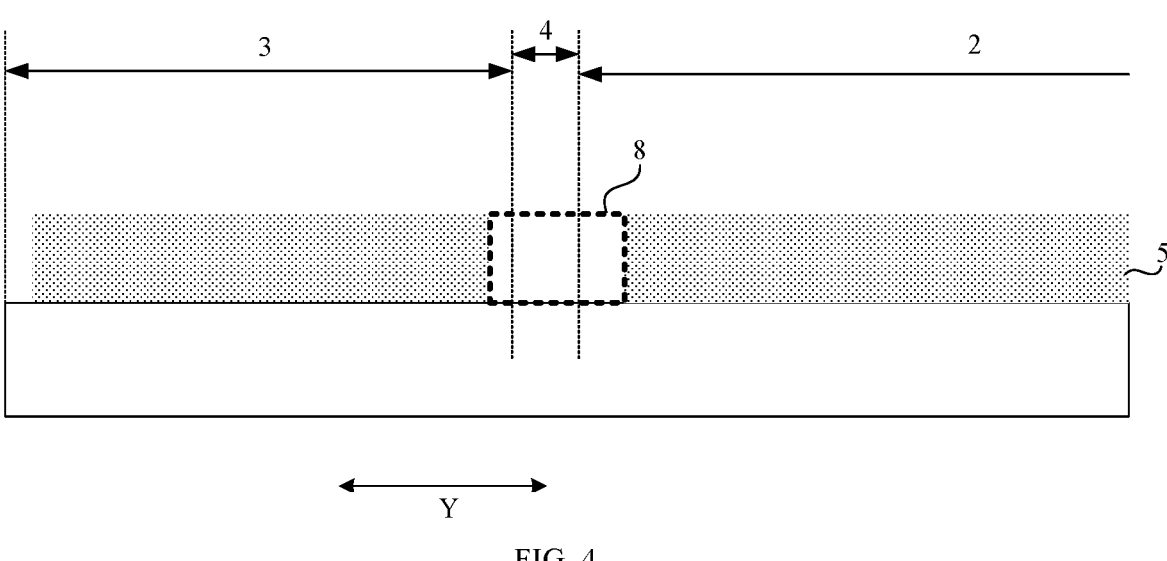
FIG. 4 is a schematic cross-sectional view taken along a line B-B' of FIG. 2.

FIG. 1 is a schematic top view of a part of a display substrate in a display port region in the prior art; FIG. 2 is an enlarged view of a region P1 in FIG. 1 at a certain magnification; FIG. 3 is a schematic cross-sectional view taken along a line A-A' of FIG. 2; FIG. 4 is a schematic cross-sectional view taken along a line B-B' of FIG. 2; as shown in FIGS. 1 to 4, the display substrate includes a first base substrate 1, including: a display port region 3 and a sealing region 2 arranged along a first direction Y. In the related art, it is necessary to pattern a planarization material film in the process of forming the planarization layer 5, to obtain a final desired pattern of the planarization layer. Trenches for exposing first connection regions 301 and second connection regions 302 are formed in the display port region 3 and on the planarization layer 5, to expose first connection terminals 6 and second connection terminals 7.

In the related art, in view of that a length of the display substrate is limited in a second direction X, the first connection regions 301 and the second connection regions 302 are generally arranged in two rows. Specifically, the plurality of first connection regions 301 are arranged at intervals along the second direction X, the plurality of second connection regions 302 are arranged at intervals along the first direction Y, and the second connection regions 302 are located on a side of the first connection regions 301 away from the sealing region 2. At this time, there may be a case where the first connection regions 301 overlap with the second connection regions 302 in the first direction Y, that is, a first overlapping region 303 is formed between at least one second connection region 302 and at least one first connection region 301, and the first overlapping region 303 is a region located between the first connection region 301 and the second connection region 302 and overlapping with both the first connection region 301 and the second connection region 302 in the first direction Y.

Referring to FIGS. 1 and 2, in view of the characteristic that the larger a size of the trenches needed to be formed in the patterning process of the planarization layer 5 is, the easier the process is to control, in the related art, generally, the first connection region 301 and the second connection region 302 with the first overlapping region 303 correspond to a same trench with a large size, including not only the first connection region 301 and the second connection region 302 but also the first overlapping region 303 located between the first connection region 301 and the second connection region 302. That is, for the first connection region 301 and the second connection region 302 with the first overlapping region 303, trenches for exposing the first connection regions 301 and for exposing the second connection regions 302 formed in the planarization layer 5 are connected to each other in the first overlapping region 303, to form a trench with a large size having a larger width in the first direction Y.

A width of the first connection region 301 in the first direction Y is w1, a width of the second connection region 302 in the first direction Y is w2, and a spacing width between the first connection region 301 and the second connection region 302 in the first direction Y (i.e. a width of the first overlapping region 303 in the first direction Y) is w3, then a width of a portion (a region Q1) of the trench with a large size corresponding to the first overlapping region 303 in the first direction Y is greater than w1+w2+w3.

It is found by analyzing yellowing display regions (regions Q2) on the display panel that the yellowing display regions on the display panel correspond to the first overlapping regions 303 in the display port region 3. Specifically, for any one yellowing display region, one first overlapping region 303 arranged in the first direction Y corresponding to the yellowing display region may be found in the display port region 3. That is, the yellowing display region is formed in a certain relation with the first overlapping region 303.

Figure 5A:
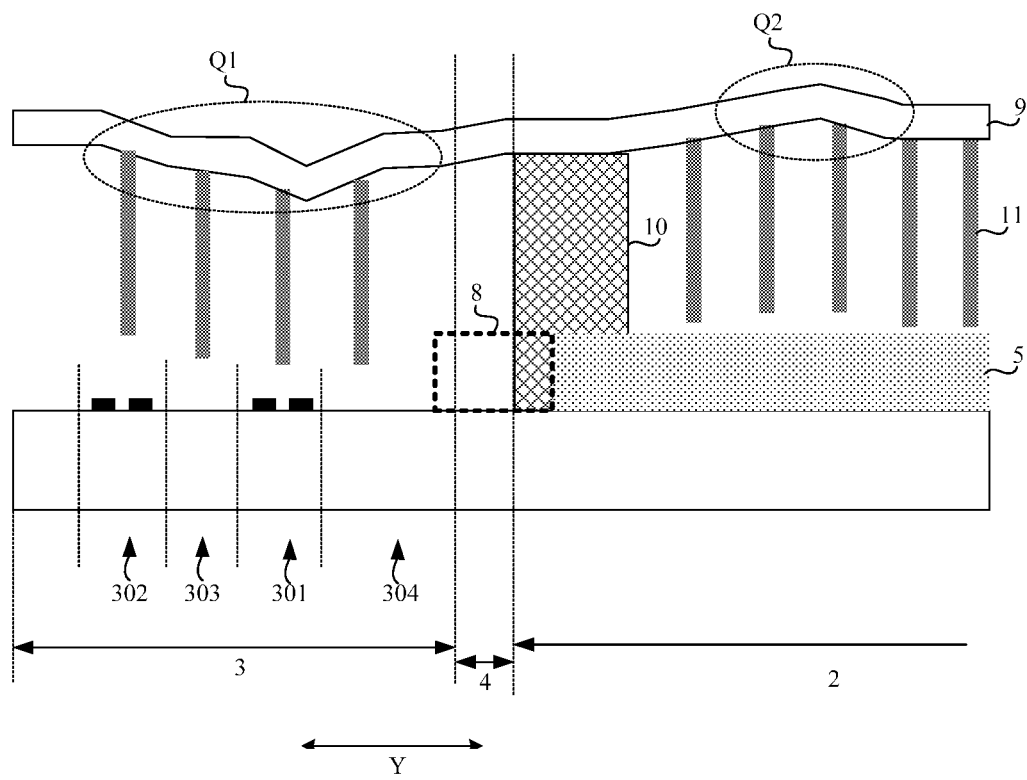
FIG. 5A is a schematic cross-sectional view illustrating that a portion of the display substrate shown in FIG. 3 and an uncut opposite substrate are opposite to each other during an aligning and assembling process.
Figure 5B:
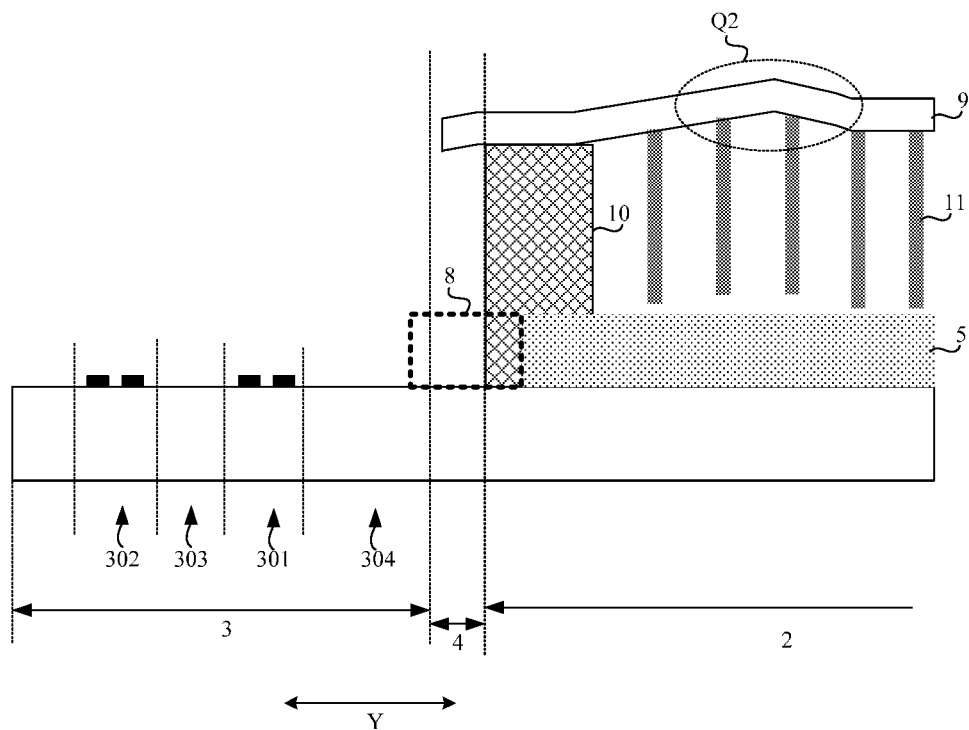
FIG. 5B is a schematic cross-sectional view illustrating the display substrate and the opposite substrate of FIG. 5A after cutting.

FIG. 5A is a schematic cross-sectional view illustrating that a portion of the display substrate shown in FIG. 3 and an uncut opposite substrate are opposite to each other during an aligning and assembling process; FIG. 5B is a schematic cross-sectional view illustrating the display substrate and the opposite substrate of FIG. 5A after cutting. As shown in FIGS. 5A to 5B, at a position of the first overlapping region 303, the trenches for exposing the first connection region 301 and for exposing the second connection region 302 formed on the planarization layer 5 are connected to each other in the first overlapping region 303, so that a thickness of the display substrate in the first overlapping region 303 is small (a thickness of the planarization layer 5 is thick, generally about 2.5 mm, and a thickness of a region of the display substrate on which the planarization layer 5 is disposed is thicker than that of a region on which the planarization layer 5 is not disposed by about 2.5 mm). At this time, a post spacer 11 disposed in the region of the opposite substrate 9 directly opposite to the region Q1 on the display substrate cannot form a support with the display substrate, so that a support strength in the region Q1 is insufficient; under the influence of gravity, the opposite substrate 9 may be deformed to be concave in the region Q1, which may extrude the nearby frame sealing glue 10, so that the frame sealing glue 10 at the corresponding position become wide and thin. At this time, the region Q2 (the region Q2 and the first overlapping region 303 are arranged along the first direction Y) of the opposite substrate 9 located in the display region 2a and close to the extruded frame sealing glue 10 in the first direction Y is deformed to be convex upward (upwarp) due to stress concentration.

Figures 6A, 6B:
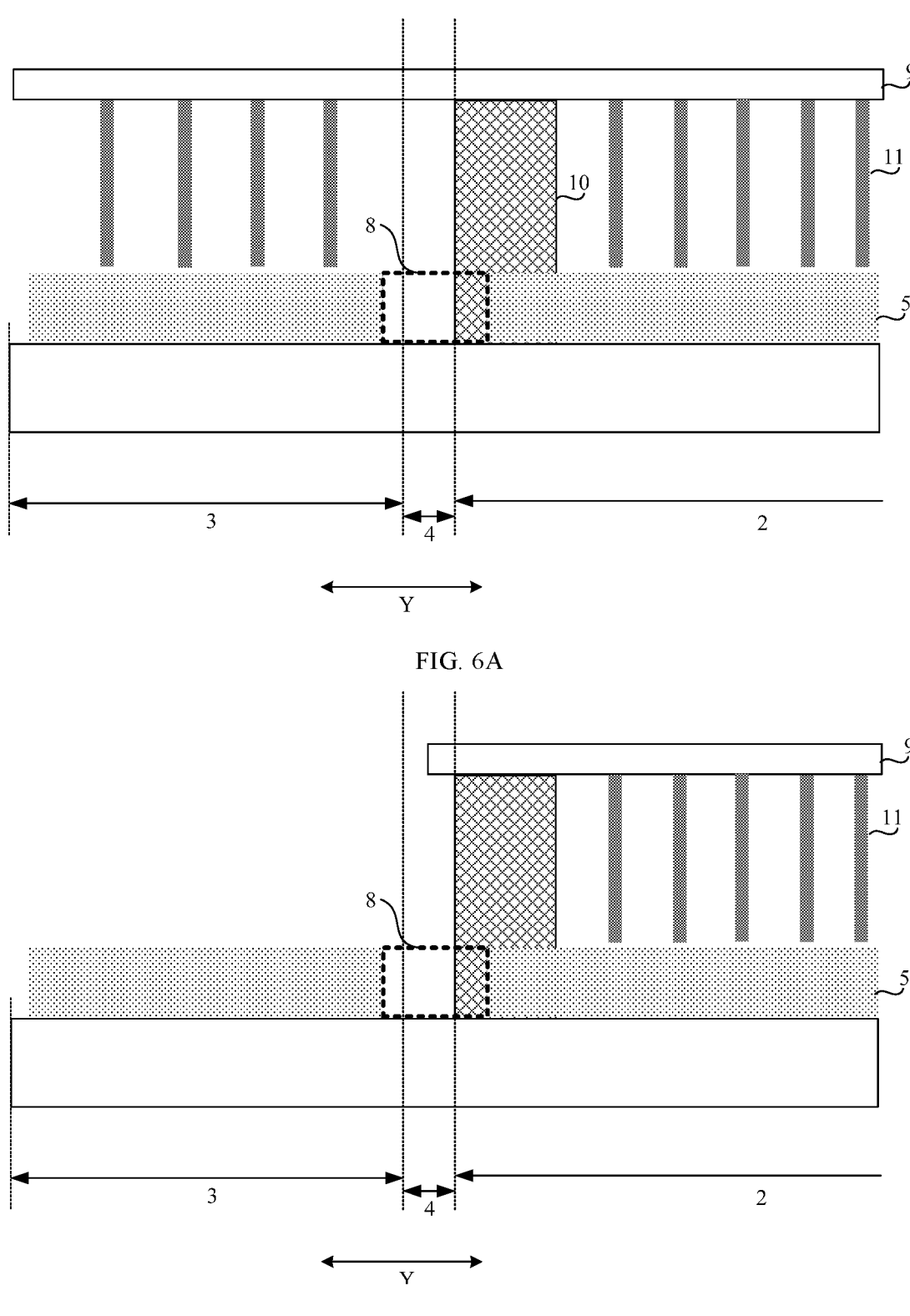
FIG. 6A is a schematic cross-sectional view illustrating that a portion of the display substrate shown in FIG. 4 and an uncut opposite substrate are opposite to each other during an aligning and assembling process.
FIG. 6B is a schematic cross-sectional view illustrating the display substrate and the opposite substrate of FIG. 6A after cutting.

FIG. 6A is a schematic cross-sectional view illustrating that a portion of the display substrate shown in FIG. 4 and an uncut opposite substrate are opposite to each other during an aligning and assembling process; FIG. 6B is a schematic cross-sectional view illustrating the display substrate and the opposite substrate of FIG. 6A after cutting. As shown in FIGS. 6A and 6B, a region (region where no trench is formed) of the display port region 3 in which the planarization layer 5 is disposed has a relatively large thickness, and the post spacers 11 on the opposite substrate 9 may be in contact with the display substrate, to form a support with a strong support strength, so that the opposite substrate 9 cannot be deformed.

After the frame sealing glue 10 is cured, the cured frame sealing glue 10 has a large elastic modulus and is not easily deformed, so that the cured frame sealing glue 10 may maintain the above upward convex deformation in the display region 2a. Even if the portion (including the portion with the concave deformation) of the opposite substrate 9 directly opposite to the display port region 3 is subsequently cut off through a cutting process, the above upward convex deformation still exists in the display region 2a due to the existence of the cured frame sealing glue 10, and a cell gap of the liquid crystal in the region corresponding to the upward convex deformation is larger, which causes the problem of the yellowing display in the corresponding region.

In order to effectively improve and even completely solve the technical problem of "yellowing display" in the related art, the present disclosure provides a corresponding solution.

Figure 8:
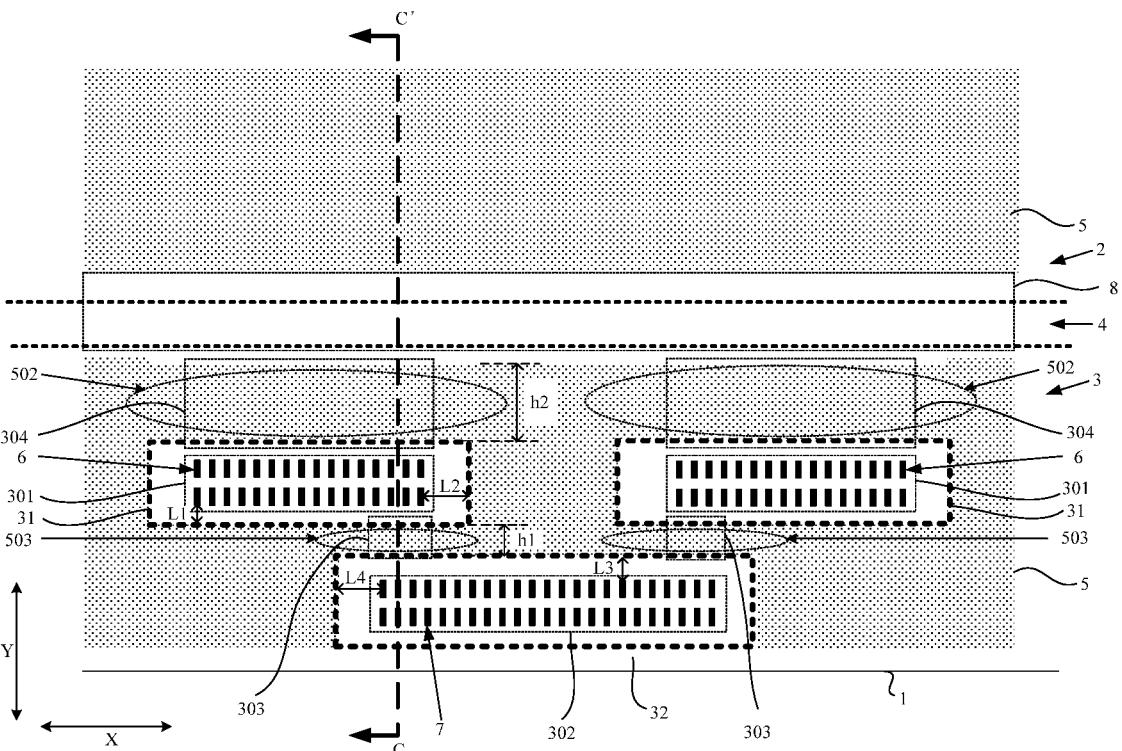
FIG. 8 is an enlarged view of a region P2 in FIG. 7 at a certain magnification.
Figure 9:
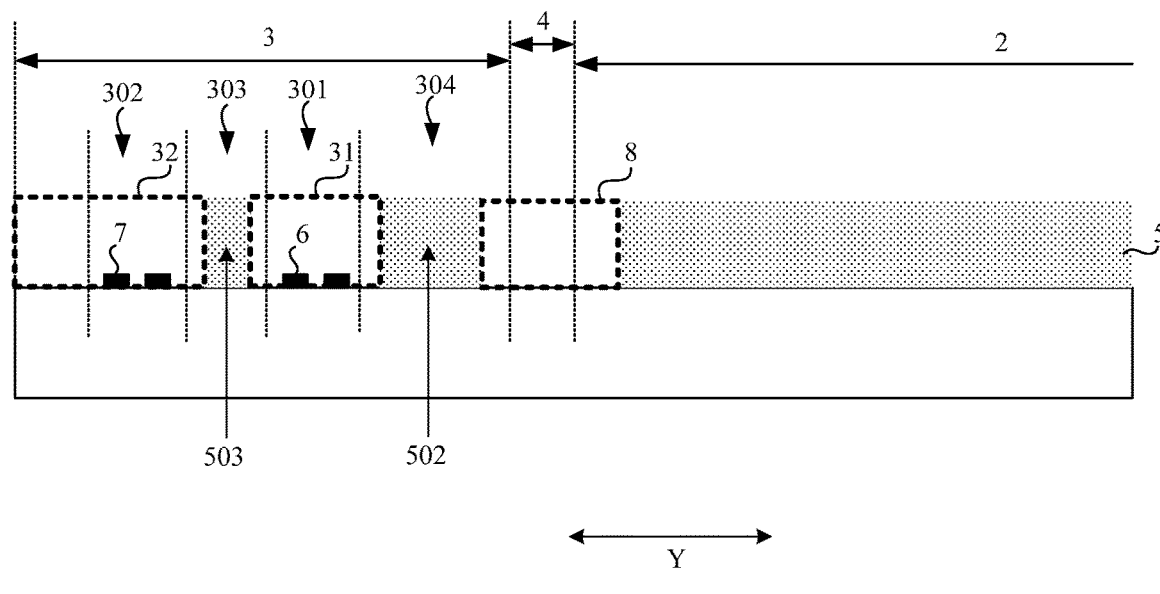
FIG. 9 is a schematic cross-sectional view taken along a line C-C' of FIG. 8.

FIG. 7 is a schematic top view of a display substrate according to embodiments of the present disclosure; FIG. 8 is an enlarged view of a region P2 in FIG. 7 at a certain magnification; FIG. 9 is a schematic cross-sectional view taken along a line C-C' of FIG. 8; FIG. 10A is a schematic cross-sectional view illustrating that a portion of the display substrate shown in FIG. 9 and an uncut opposite substrate are opposite to each other during an aligning and assembling process; FIG. 10B is a schematic cross-sectional view illustrating the display substrate and the opposite substrate 9 of FIG. 10A after cutting. As shown in FIGS. 7 to 10B, embodiments of the present disclosure provide a display substrate, including: the first base substrate 1, the plurality of first connection terminals 6, the plurality of second connection terminals 7, and the planarization layer 5.

The first base substrate 1 includes the sealing region 2 and the display port region 3 arranged along the first direction Y, at least one first connection region 301 and at least one second connection region 302 located on a side of the first connection region 301 away from the sealing region 2 are arranged in the display port region 3, the second connection region 302 and the first connection region 301 are arranged at intervals, a first overlapping region 303 is formed between the at least one second connection region 302 and the at least one first connection region 301, and the first overlapping region 303 is a region between the first connection region 301 and the second connection region 302 and overlapping with the first connection region 301 and the second connection region 302 in the first direction Y.

The plurality of first connection terminals 6 and the plurality of second connection terminals 7 are located on the first base substrate 1, the first connection terminals 6 are located in the first connection region 301, and the second connection terminals 7 are located in the second connection region 302. In the embodiments of the present disclosure, the first connection region 301 may be the IC connection region, the second connection region 302 may be the FPC connection region, the first connection terminals 6 may be IC connection terminals, and the second connection terminals 7 may be FPC connection terminals.

The planarization layer 5 is located on a side of the first connection terminals 6 and the second connection terminals 7 away from the first base substrate 1, and is provided with at least one first trench 31 corresponding to the first connection region 301 and at least one second trench 32 corresponding to the second connection region 302 therein; an orthographic projection of a bottom of the first trench 31 on the first base substrate 1 covers the corresponding first connection region 301, an orthographic projection of a bottom of the second trench 32 on the first base substrate 1 covers the corresponding second connection region 302. The planarization layer 5 includes: a first pattern 503 corresponding to the first overlapping region 303, wherein an orthographic projection of the first pattern 503 on the first base substrate 1 overlaps with an orthographic projection of the corresponding first overlapping region 303 on the first base substrate 1.

It should be noted that the P2 region in FIG. 7 and the P1 region in FIG. 2 may be the same region on the display substrate.

The "trench" provided in the planarization layer 5 in the embodiments of the present disclosure specifically refers to a trench capable of penetrating the planarization layer 5 in a thickness direction of the planarization layer 5. The "bottom" of the trench refers to an opening of the trench on a side close to the first base substrate 1.

Unlike the related art in which the planarization layer 5 has a trench structure in the first overlapping region 303, in the present disclosure, the planarization layer 5 is provided with a corresponding first pattern 503 in the first overlapping region 303, and an orthographic projection of the first pattern 503 on the first base substrate 1 overlaps with the corresponding first overlapping region 303, that is, at least a portion of the first pattern 503 in the planarization layer 5 is located in the first overlapping region 303. Referring to FIG. 10A, in the process of aligning and assembling the display substrate and the opposite substrate 9, the region covered by the first pattern 503 in the first overlapping region 303 of the display substrate has a larger thickness, so that the post spacers 11 may support the display substrate and the opposite substrate 9 in the first overlapping region 303. In this way, the problem that the opposite substrate 9 is deformed to be concave in the first overlapping region 303 and around the first overlapping region 303 can be effectively improved, or even completely avoided, and further the problem that the opposite substrate 9 is deformed to be convex upward in the display region 2a can be effectively improved, or even completely avoided, so that the problem of the yellowing display for the portion of the display region 2a close to the display port region 3 can be effectively solved.

It should be noted that in the embodiments of the present disclosure, the first pattern 503 may be entirely located in the first overlapping region 303, or may be partially located in the first overlapping region 303 and partially located outside the first overlapping region 303; the first pattern 503 may cover the entire first overlapping region 303, or may cover a part of the first overlapping region 303; which is not limited by the present disclosure. It will be appreciated by one of ordinary skill in the art that the problem of the "yellowing display" in the related art can be improved as long as the first pattern 503 may exist in at least a partial region within the first overlapping region 303.

In addition, in the embodiments of the present disclosure, other structures are further provided between the first base substrate 1 and the planarization layer 5, and on a side of the planarization layer 5 away from the first base substrate 1. Taking the portion located in the display region 2a as an example, in the display region 2a, thin film transistors, various signal traces (such as gate lines, data lines, and common voltage lines) and the like are disposed between the first base substrate 1 and the planarization layer 5, and a common electrode, an interlayer insulating layer, a pixel electrode and the like are disposed on a side of the planarization layer 5 away from the first base substrate 1. These structures, which are located between the first base substrate 1 and the planarization layer 5 and on the side of the planarization layer 5 away from the first base substrate 1, are not shown in the drawings.

In some embodiments, a width of the first overlapping region 303 in the first direction Y is greater than or equal to 500 μm. That is, a distance between the first connection region 301 and the second connection region 302 in the first direction Y is greater than or equal to 500 μm, which facilitates an IC bonding process and an FPC bonding process.

A length of the first overlapping region 303 in the second direction X is determined according to a length and a relative position of the corresponding first connection region 301 and second connection region 302, which is not limited by the present disclosure. In addition, the arrangement of the first connection region 301 and the second connection region shown in the drawings is only exemplary, and does not limit the technical solution of the present disclosure. In the embodiments of the present disclosure, it is only necessary to ensure that the at least one first connection region 301 and the at least one second connection region 302 in the first direction Y overlap with each other in the display substrate.

In some embodiments, the first pattern 503 extends along the second direction X and traverses the corresponding first overlapping region 303 in the second direction X; the second direction X intersects the first direction Y. With the above arrangement, a groove having a large width in the first direction Y may not be present at a position where the first overlapping region 303 is located. That is to say, in the aligning and assembling process, the post spacers 11 distributed in the first overlapping region 303 and along the second direction X may provide a better support, which is beneficial to improving the overall flatness of the portion of the opposite substrate 9 directly opposite to the first overlapping region 303, so as to better improve the problem of "yellowing display".

In the embodiments of the present disclosure, as an example, the second direction X is the row direction in FIG. 7, and the first direction Y is the column direction in FIG. 7 for description.

In some embodiments, the first trench 31 and the second trench 32 corresponding to the first connection region 301 and the second connection region 302 with the first overlapping region 303 are separated from each other along the first direction Y by the first pattern 503 corresponding to the first overlapping region 303, respectively.

In order to avoid peeling of the first pattern 503 between the first and second trenches 31 and 32, in some embodiments of the present disclosure, a width h1 of the first pattern 503 in the first direction Y is greater than or equal to 120 μm.

With continued reference to FIGS. 1 to 5B, in the related art, a material of the planarization layer 5 has a certain hydroscopicity, and a portion of the planarization layer 5 located in the exposed display port region 3 easily absorbs the moisture in the environment and transmit the moisture to the inside of the sealing region 2, so as to generate an electrochemical corrosion on structures (e.g., a metal material structure, a semiconductor material structure) located in the sealing region 2, and further generate some defects. In order to solve the above technical problem, in the related art, a first separation region 4 is disposed between the sealing region 2 and the display port region 3 and extends along the second direction X, a separation trench 8 corresponding to the first separation region 4 is formed in the planarization layer 5, and an orthographic projection of a bottom of the separation trench 8 on the first base substrate 1 covers the first separation region 4. By providing the separation trench 8, a portion of the planarization layer 5 located in the sealing region 2 is separated from a portion of the planarization layer 5 located in the display port region 3, so that the portion of the planarization layer 5 located in the exposed display port region 3 can be effectively prevented from transferring absorbed moisture into the sealing region 2.

The first separation region 4 has a linear shape extending along the second direction X, a corresponding second overlapping region 304 is formed between each first connection region 301 and the first separation region 4, and is a region located between the first connection region 301 and the first separation region 4 and overlapping with both the first connection region 301 and the first separation region 4 in the first direction Y. Similarly, in view of the characteristic that the larger a size of the trenches needed to be formed in the patterning process of the planarization layer 5 is, the easier the process is to control, in the related art, generally, the first connection region 301 and the first separation region 4 with the second overlapping region 304 correspond to a same trench with a large size, covering not only the first connection region 301 and the first separation region 4 but also the second overlapping region 304 located between the first connection region 301 and the first separation region 4. That is, the separation trench 8 and the trench for exposing the first connection region 301 formed in the planarization layer 5 are connected to each other in the second overlapping region 304, to form a trench with a large size having a larger width in the first direction Y.

Similarly, a thickness of a portion of the display substrate in the second overlapping region 304 and thicknesses of regions (a region where the separation trench 8 is located and a region where the trench for exposing the first overlapping region 301 is located) of the display substrate on the two opposite sides of the second overlapping region 304 in the first direction Y are all small, which may cause that a post spacer 11 disposed in the region of the opposite substrate 9 directly opposite to the second overlapping region 304 cannot form a support with the display substrate in the aligning and assembling process, so that a support strength in the second overlapping region 304 is insufficient; under the influence of gravity, the opposite substrate 9 may be deformed to be concave in the second overlapping region

304, which may extrude the nearby frame sealing glue 10, so that the frame sealing glue 10 at the corresponding position become wide and thin. At this time, the region (the region and the second overlapping region 304 are arranged along the first direction Y) of the opposite substrate 9 located in the display region 2a and close to the extruded frame sealing glue 10 in the first direction Y is deformed to be convex upward due to stress concentration.

It should be noted that in the related art, the trench for exposing the first connection region 301 is connected to the trench for exposing the second connection region 302 in the first overlapping region 303, and connected to the separation trench 8 for separating the planarization layer 5 in the second overlapping region 304, and the trench for exposing the first connection region 301, the trench for exposing the second connection region 302, and the separation trench 8 for separating the planarization layer 5 together form a groove with a larger size. If a separation width between the first connection region 301 and the first separation region 4 in the first direction Y (i.e. a width of the second overlapping region 304 in the first direction Y) is w4, and a width of the first separation region 4 in the first direction Y is w5, then a width of a portion (region Q1) of the groove with a larger size corresponding to the first overlapping region 303 in the first direction Y is greater than w1+w2+w3+w4+w5. A more severe concave deformation will occur in the region Q1, which causes a more severe upward convex deformation in a corresponding region Q2 in the display region 2a on the opposite substrate 9, and further causes a more severe problem of "yellowing display".

It can be seen that the above arrangement of the separation trench 8 and the design of the separation trench 8 connected to the trench for exposing the first connection region 301 through the second overlapping region 304 also causes the problem of "yellowing display".

In view of the above technical problems, the present disclosure further provides a corresponding solution. Specifically, in some embodiments, a third trench 8 (i.e., the separation trench 8) corresponding to the first separation region 4 is further formed in the planarization layer 5, and an orthographic projection of a bottom of the third trench 8 on the first base substrate 1 covers the first separation region 4; the planarization layer 5 further includes: a second pattern 502 corresponding to the second overlapping region 304, wherein an orthographic projection of the second pattern 502 on the first base substrate 1 overlaps with the second overlapping region 304.

Unlike the related art in which the planarization layer 5 has a trench structure in the second overlapping region 304, in the present disclosure, the planarization layer 5 is provided with a corresponding second pattern 502 in the second overlapping region 304, and an orthographic projection of the second pattern 502 on the first base substrate 1 overlaps with the corresponding second overlapping region 304, that is, at least a portion of the second pattern 502 in the planarization layer 5 is located in the second overlapping region 304. Referring to FIG. 10A, in the process of aligning and assembling the display substrate and the opposite substrate 9, the region covered by the second pattern 502 in the second overlapping region 304 of the display substrate has a larger thickness, so that the post spacers 11 may support the display substrate and the opposite substrate 9 in the second overlapping region 304. In this way, the problem that the opposite substrate 9 is deformed to be concave in the second overlapping region 304 and around the second overlapping region 304 can be effectively improved, or even completely avoided, and further the problem that the opposite substrate 9 is deformed to be convex upward in the display region 2a can be effectively improved, or even completely avoided, so that the problem of the yellowing display for the portion of the display region 2a close to the display port region 3 can be effectively solved.

It should be noted that in the embodiments of the present disclosure, the second pattern 502 may be entirely located in the second overlapping region 304, or may be partially located in the second overlapping region 304 and partially located outside the second overlapping region 304; the second pattern 502 may cover the entire second overlapping region 304, or may cover a part of the second overlapping region 304; which is not limited by the present disclosure. It will be appreciated by one of ordinary skill in the art that the problem of the "yellowing display" in the related art can be improved as long as the second pattern 502 may exist in at least a partial region within the second overlapping region 304.

In some embodiments, a width of the second overlapping region 304 in the first direction Y is greater than or equal to 400 μm. That is to say, a distance between the first connection region 301 and the first separation region 4 in the first direction Y is greater than or equal to 400 μm, which may facilitate the IC bonding process and ensure that the portion of the planarization layer 5 located in the display port region 3 keeps a certain distance from the sealing region 2. It should be noted that a length of the second overlapping region 304 in the second direction X is determined according to a length of the corresponding first connection region 301.

In some embodiments, the second pattern 502 extends along the second direction X and traverses the corresponding second overlapping region 304 in the second direction X; the second direction X intersects the first direction Y. With the above arrangement, a groove having a large width in the first direction Y may not be present at a position where the second overlapping region 304 is located. That is to say, in the aligning and assembling process, the post spacers 11 distributed in the second overlapping region 304 and along the second direction X may provide a better support, which is beneficial to improving the overall flatness of the portion of the opposite substrate 9 directly opposite to the second overlapping region 304, so as to better improve the problem of "yellowing display".

In some embodiments, the first trench 31 and the third trench 8 corresponding to the first connection region 301 and the first separation region 4 with the second overlapping region 304 are separated from each other by the second pattern 502 corresponding to the second overlapping region 304, respectively.

In order to avoid peeling of the second pattern 502 between the first trench 31 and the third trench 8, in some embodiments of the present disclosure, a width of the second pattern 502 in the first direction Y is greater than or equal to 120 μm.

In some embodiments, the sealing region 2 includes: a display region 2a and a non-display region 2a surrounding the display region 2a, wherein a region where the orthographic projection of the bottom of the third trench 8 on the first base substrate 1 located is a first projection region; an edge of the first projection region close to the display region 2a is located in the non-display region 2a. That is, after the aligning and assembling process, the portion of the planarization layer 5 located in the display port region 3 and the portion of the planarization layer 5 located in the sealing region 2 may be effectively separated from each other by the frame sealing glue 10.

Generally, an outer edge of the portion of the planarization layer 5 located in the sealing region 2 is covered by the frame sealing glue 10. Alternatively, the outer edge of the portion of the planarization layer 5 located in the sealing region 2 may be located inside the frame sealing glue 10.

In some embodiments, a plurality of first connection regions 301 and a plurality of first trenches 31 are included and are in one-to-one correspondence with each other; the first trenches 31 are arranged at intervals along the second direction X, and a distance between any two adjacent first trenches 31 in the second direction X is greater than or equal to 6 μm. With the arrangement, a portion of the display substrate between the adjacent first connection regions 301 has a larger thickness, to form a better support with the post spacers 11 on the opposite substrate 9.

In some embodiments, a plurality of second connection regions 302 and a plurality of second trenches 32 are included and are in one-to-one correspondence with each other; the second trenches 32 are arranged at intervals along the second direction X, and a distance between any two adjacent second trenches 32 in the second direction X is greater than or equal to 6 μm. With the arrangement, a portion of the display substrate between the adjacent second connection regions 302 has a larger thickness, to form a better support with the post spacers 11 on the opposite substrate 9.

In some embodiments, a region where an orthographic projection of the planarization layer 5 on the base substrate is located is a second projection region; for any one of the first connection terminals 6, a minimum distance L1 from the first connection terminal 6 to the second projection region along the first direction Y is greater than or equal to 50 μm; for any one of the first connection terminals 6, a minimum distance L2 from the first connection terminal 6 to the second projection region along the second direction X is greater than or equal to 1500 μm; for any one of the second connection terminals 7, a minimum distance L3 from the second connection terminal 7 to the second projection region along the first direction Y is greater than or equal to 50 μm; for any one of the second connection terminals 7, a minimum distance L4 from the second connection terminal 7 to the second projection region along the second direction X is greater than or equal to 1500 μm. Such the arrangement can facilitate the IC bonding process and the FPC bonding process.

FIG. 11 is an enlarged view of a region P3 in FIG. 7 at a certain magnification; FIG. 12 is a schematic cross-sectional view of a functional region and its surrounding region according to embodiments of the present disclosure; as shown in FIGS. 11 and 12, in some embodiments, the first base substrate 1 further includes a second separation region 21, and the second separation region 21 and the sealing region 2 are arranged along the second direction X; the sealing region 2 includes: the display region 2a and the non-display region surrounding the display region 2a, the non-display region including: a functional region 2b located between the display region 2a and the second separation region 21; the functional region 2b includes: a driving circuit arrangement region 41, a driving circuit clock signal trace arrangement region 42, and a display signal trace arrangement region 43, which are sequentially arranged in the second direction X and away from the display region 2a; wherein a gate driving circuit 41a (generally including transistors, capacitors, and the like) is disposed in the driving circuit arrangement region 41, a plurality of driving circuit clock signal traces 42a (for example, clock signal traces for controlling on/off of transistors in gate driving transistors, clock signal traces for outputting by the gate driving circuit 41a, and the like) are disposed in the driving circuit clock signal trace arrangement region 42, and a display signal trace 43a (for example, a common voltage trace for providing a common voltage Vcom to pixel units in the display region 2a, a ground trace for providing a ground voltage Vgnd, and the like) is disposed in the display signal trace arrangement region 43; a fourth trench 58 corresponding to the second separation region 21 is provided in the planarization layer 5, and an orthographic projection of the fourth trench 58 on the first base substrate 1 covers the second separation region 21; a region where an orthographic projection of a bottom of the fourth trench 58 on the first base substrate 1 is located is a third orthographic projection region, and an edge of the third orthographic projection region close to the display region 2a is located between the driving circuit arrangement region 41 and an edge of the display signal trace arrangement region 43 close to the second separation region 21.

The fourth trench 58 provided in the planarization layer 5 corresponding to the second separation region 21 has the same function as the third trench 8 provided in the planarization layer 5 corresponding to the first separation region 4, both are used to separate the portion of the planarization layer 5 located inside the sealing region 2 from the portion located outside the sealing region 2, so as to prevent moisture from entering the inside of the sealing region 2 through the planarization layer.

In some embodiments, in consideration of that the driving circuit clock signal traces 42a in the driving circuit clock signal trace arrangement region 42 are all configured as a set, voltages of clock signals loaded in the driving circuit clock signal traces 42a in a high level state are all the same, voltages of the clock signals loaded in the driving circuit clock signal traces 42a in a low level state are all the same, and there are strict requirements on a timing of the clock signals loaded in the driving circuit clock signal traces 42a. If the edge of the third orthographic projection region close to the display region 2a is located in the driving circuit clock signal trace arrangement region 42, a part of the driving circuit clock signal traces 42a are covered by the planarization layer 5, and the other part of the driving circuit clock signal traces 42a are not covered by the planarization layer 5, and at this time, there is a load difference between the driving circuit clock signal traces 42a covered by the planarization layer 5 and the driving circuit clock signal traces 42a not covered by the planarization layer 5, which causes a difference between a clock timing finally provided for the gate driving circuit 41a and a pre-designed clock timing, thereby causing abnormal operation of the gate driving circuit 41a, and further causing abnormal operation of the pixel units located in the display region 2a, and causing a problem of cross striation or abnormal display.

In view of the above problem, in some embodiments, the edge of the third orthographic projection region close to the display region 2a does not overlap with the driving circuit clock signal trace arrangement region 42; that is, the planarization layer 5 covers either all the driving circuit clock signal traces 42a or none of the driving circuit clock signal traces 42a.

In some embodiments, the edge of the third orthographic projection region away from the display region 2a is flush with an edge of the first base substrate 1 on a same side. That is, the fourth trench 58 extends to the edge of the first base substrate.

Referring to FIGS. 11 and 12, in some embodiments, the functional region 2b further includes: a driving circuit non-clock signal trace arrangement region 44 located between the driving circuit clock signal trace arrangement region 42 and the driving circuit arrangement region 41; and driving circuit non-clock signal traces 44a (for example, a high-level voltage supply line for supplying a high-level voltage VGH to the gate driving circuit 41a, a low-level voltage supply line for supplying a low-level voltage VGL to the gate driving circuit 41a, a global reset signal line for supplying a global reset voltage to the gate driving circuit 41a) is provided in the driving circuit non-clock signal trace arrangement region 44; the edge of the third orthographic projection region close to the display region 2a may be located in the driving circuit non-clock signal trace arrangement region 44 or in the display signal trace arrangement region 43. In consideration of that the farther an edge of the portion of the planarization layer 5 located in the sealing region 2 is from an edge of the sealing region 2 on a same side (the wider a width of the fourth trench 58 in the second direction X is), the stronger the capability of blocking moisture is, preferably, the edge of the third orthographic projection region close to the display region 2a may be located in the driving circuit non-clock signal trace arrangement region 44.

In the case shown in FIGS. 11 and 12, the edge of the third orthographic projection region close to the display region 2a is located within the driving circuit non-clock signal trace arrangement region 44. As a specific example, the frame sealing glue 10 disposed in the aligning and assembling process covers the whole display signal trace arrangement region 43 and a part of the driving circuit clock signal trace arrangement region 42, and does not cover the driving circuit non-clock signal trace arrangement region 44. At this time, the width K1 of the designed fourth trench 58 in the second direction X satisfies:

$$K2+K0 : SK1 : S1.4 \times K2+K0$$

where K0 is a width of the second separation region 21 in the second direction X, and K2 is a width of a frame sealing glue coating region 10' disposed on the display substrate and close to the second separation region 21 in the aligning and assembling process in the second direction X. As an alternative example, K1:1.2×K2+ K0, K0 is about 250 μm, K2 is about 750 μm, and K1 is about 1150 μm.

FIG. 13 is another enlarged view of a region P3 in FIG. 7 at a certain magnification; FIG. 14 is a schematic cross-sectional view of a functional region 2b and its surrounding region according to embodiments of the present disclosure; as shown in FIG. 13 and FIG. 14, in some embodiments, the display substrate is used as a display substrate in a narrow-frame display apparatus. At this time, the display signal trace arrangement region 43 is relatively narrow, and the driving circuit non-clock signal trace arrangement region 44 is directly disposed in the gate driving circuit arrangement region 41.

In view of the conclusion obtained by the above analysis that an edge of the fourth trench 58 is not disposed in the driving circuit clock signal trace arrangement region 42 as far as possible, it is preferable to dispose the edge of the fourth trench 58 in the display signal trace arrangement region 43; that is, the edge of the third orthographic projection region close to the display region 2a is located in the display signal trace arrangement region 43.

In the case shown in FIGS. 13 and 14, the edge of the third orthographic projection region close to the display region 2a is located within the display signal trace arrangement region 43. As a specific example, the frame sealing glue 10 disposed in the aligning and assembling process covers the whole display signal trace arrangement region 43, the whole driving circuit clock signal trace arrangement region 42 and a part of the gate driving circuit arrangement region 41, and does not cover the driving circuit non-clock signal trace arrangement region 44. At this time, the width K1 of the designed fourth trench 58 in the second direction X satisfies:

$$K0 < K1 : S1/2 \times K2 + K0$$

where K0 is a width of the second separation region 21 in the second direction X, and K2 is a width of a frame sealing glue coating region 10' disposed on the display substrate and close to the second separation region 21 in the aligning and assembling process in the second direction X. As an alternative example, K1:⅓×K2+K0, K0 is about 250 μm, K2 is about 750 μm, and K1 is about 500 μm.

Based on the same inventive concept, the embodiments of the present disclosure further provide a display panel. FIG. 15 is a schematic cross-sectional view of a display panel according to embodiments of the present disclosure. As shown in FIG. 15, the display panel includes: a display substrate 61 and an opposite substrates 62 disposed opposite to the display substrate 61, wherein the display substrate 61 may adopt the display substrate 61 provided in the above embodiments, and the detailed description may refer to the contents in the foregoing embodiments.

In some embodiments, the frame sealing glue 10 is formed between the display substrate 61 and the opposite substrate 62, an outer edge of the frame sealing glue 10 is an edge of the sealing region 2, and the frame sealing glue 10 is configured to seal a space between the display substrate 61 and the opposite substrate 62. A liquid crystal layer (not shown) is filled in a sealed space defined by the frame sealing glue 10, the display substrate 61, and the opposite substrate 62.

In some embodiments, post spacers 11 are provided on a side of the opposite substrate 62 close to the display substrate 61, to support the cell gap of the liquid crystal.

In some embodiments, the display substrate 61 may be an array substrate, and the opposite substrate 62 may be a color filter substrate; the color film substrate may include a second base substrate and a color film located on a side of the second substrate close to the array substrate.

Based on the same inventive concept, embodiments of the present disclosure further provide a display apparatus, including: the display panel provided in the foregoing embodiments; for the description of the display panel, reference may be made to the foregoing embodiments, and details are not repeated herein.

The display apparatus provided by the embodiments may be: any product or component with a display function, such as a wearable device, a mobile phone, a tablet computer, a television, a display, a notebook computer, a digital photo frame, a navigator or the like. Other essential components of the display apparatus are understood by one of ordinary skill in the art, and are not described herein or should not be construed as limiting the present disclosure.

It should be understood that the above embodiments are merely exemplary embodiments adopted to explain the principles of the present disclosure, and the present disclosure is not limited thereto. It will be apparent to one of ordinary skill in the art that various changes and modifications may be made therein without departing from the spirit and scope of the present disclosure, and such changes and modifications also fall within the scope of the present disclosure.

What is claimed is:

1. A display substrate, comprising:

a first base substrate comprising a sealing region and a display port region arranged along a first direction, wherein at least one first connection region and at least one second connection region arranged on a side of the at least one first connection region away from the sealing region are in the display port region, the at least one second connection region and the at least one first connection region are arranged at intervals, at least one first overlapping region is formed between the at least one second connection region and the at least one first connection region, and each of the at least one first overlapping region is a region between one of the at least one first connection region and one of the at least one second connection region and overlapping with the first connection region and the second connection region in the first direction;

a plurality of first connection terminals and a plurality of second connection terminals on the first base substrate, wherein the plurality of first connection terminals are in the at least one first connection region, and the plurality of second connection terminals are in the at least one second connection region; and a planarization layer on a side of the plurality of first connection terminals and the plurality of second connection terminals away from the first base substrate, wherein at least one first trench corresponding to the at least one first connection region and at least one second trench corresponding to the at least one second connection region are provided in the planarization layer; an orthographic projection of a bottom of each of the at least one first trench on the first base substrate covers a corresponding first connection region, an orthographic projection of a bottom of each of the at least one second trench on the first base substrate covers a corresponding second connection region; the planarization layer comprises: at least one first pattern corresponding to the at least one first overlapping region; an orthographic projection of the first pattern on the first base substrate overlaps with a corresponding first overlapping region, wherein the display substrate further comprises a first separation region between the sealing region and the display port region, wherein at least one second overlapping region is formed between the at least one first connection region and the first separation region, and each of the at least one second overlapping region is a region between one of the at least one first connection region and the first separation region and overlapping with both the first connection region and the first separation region in the first direction;

the planarization layer is provided with a third trench corresponding to the first separation region, and an orthographic projection of a bottom of the third trench on the first base substrate covers an orthographic projection of the third trench on the first base substrate; and the planarization layer further comprises: at least one second pattern corresponding to the at least one second overlapping region, and an orthographic projection of the second pattern on the first base substrate overlaps with a corresponding second overlapping region.

2. The display substrate of claim 1, wherein the first pattern extends along a second direction and traverses the corresponding first overlapping region in the second direction; and the second direction intersects the first direction.

3. The display substrate of claim 1, wherein the first trench and the second trench corresponding to the first connection region and the second connection region with the first overlapping region therebetween are separated from each other along the first direction by the first pattern corresponding to the first overlapping region.

4. The display substrate of claim 1, wherein the first overlapping region has a width in the first direction of greater than or equal to 500 μm; and wherein the first pattern has a width in the first direction of greater than or equal to 120 μm.

5. The display substrate of claim 1, wherein the second pattern extends along the second direction and traverses the corresponding second overlapping region in the second direction; and the second direction intersects the first direction.

6. The display substrate of claim 1, wherein the first trench and the third trench corresponding to the first connection region and the first separation region with the second overlapping region therebetween are separated from each other by the second pattern corresponding to the second overlapping region.

7. The display substrate of claim 1, wherein the second overlapping region has a width in the first direction of greater than or equal to 400 μm; and the second pattern has a width in the first direction of greater than or equal to 120 μm.

8. The display substrate of claim 1, wherein the sealing region comprises: a display region and a non-display region surrounding the display region, and a region where the orthographic projection of the bottom of the third trench on the first base substrate is located is a first projection region; and an edge of the first projection region close to the display region is within the non-display region.

9. The display substrate of claim 1, wherein the at least one first connection region comprises a plurality of first connection regions, the at least one first trench comprises a plurality of first trenches, the plurality of first trenches and the plurality of first connection regions are in one-to-one correspondence with each other, the plurality of first trenches are arranged at intervals along a second direction; and a distance between any two adjacent first trenches in the second direction is greater than or equal to 6 μm; and/or the at least one second connection region comprises a plurality of second connection regions, the at least one second trench comprises a plurality of second trenches, the plurality of second trenches and the plurality of second connection regions are in one-to-one correspondence with each other, the plurality of second trenches are arranged at intervals along the second direction; and a distance between any two adjacent second trenches in the second direction is greater than or equal to 6 μm, wherein the second direction intersects the first direction.

10. A display panel, comprising: the display substrate of claim 1 and an opposite substrate opposite to the display substrate.

11. The display panel of claim 10, further comprising:

a post spacer on a side of the opposite substrate close to the display substrate; and a frame sealing glue between the display substrate and the opposite substrate;

wherein an outer edge of the frame sealing glue is an edge of the sealing region.

12. The display panel of claim 11, wherein the first base substrate further comprises a second separation region; the second separation region and the sealing region are arranged in a second direction; the sealing region comprises: a display region and a non-display region surrounding the display region, the non-display region comprising: a functional region between the display region and the second separation region; the functional region comprises: a driving circuit arrangement region, a driving circuit clock signal trace arrangement region, and a display signal trace arrangement region, which are sequentially arranged away from the display region in the second direction; the driving circuit arrangement region is provided with a gate driving circuit therein, the driving circuit clock signal trace arrangement region is provided with a plurality of driving circuit clock signal traces therein, and the display signal trace arrangement region is provided with a display signal trace therein; the planarization layer is provided with a fourth trench corresponding to the second separation region therein, and an orthographic projection of the fourth trench on the first base substrate covers the second separation region; and a region where an orthographic projection of a bottom of the fourth trench on the first base substrate is located is a third orthographic projection region, and an edge of the third orthographic projection region close to the display region is between the driving circuit arrangement region and an edge of the display signal trace arrangement region close to the second separation region; wherein the second direction intersects the first direction, the edge of the third orthographic projection region close to the display region is in the display signal trace arrangement region, and a width K1 of the fourth trench in the second direction satisfies:

$$K0 < K1 \leq \tfrac{1}{2} \times K2 + K0,$$

where K0 is a width of the second separation region in the second direction, and K2 is a width, in the second direction, of the frame sealing glue at a side close to the second separation region.

13. The display panel of claim 11, wherein the first base substrate further comprises a second separation region; the second separation region and the sealing region are arranged in a second direction; the sealing region comprises: a display region and a non-display region surrounding the display region, the non-display region comprising: a functional region between the display region and the second separation region; the functional region comprises: a driving circuit arrangement region, a driving circuit clock signal trace arrangement region, and a display signal trace arrangement region, which are sequentially arranged away from the display region in the second direction; the driving circuit arrangement region is provided with a gate driving circuit therein, the driving circuit clock signal trace arrangement region is provided with a plurality of driving circuit clock signal traces therein, and the display signal trace arrangement region is provided with a display signal trace therein; the planarization layer is provided with a fourth trench corresponding to the second separation region therein, and an orthographic projection of the fourth trench on the first base substrate covers the second separation region; and a region where an orthographic projection of a bottom of the fourth trench on the first base substrate is located is a third orthographic projection region, and an edge of the third orthographic projection region close to the display region is between the driving circuit arrangement region and an edge of the display signal trace arrangement region close to the second separation region; wherein the second direction intersects the first direction, wherein the functional region further comprises: a driving circuit non-clock signal trace arrangement region; the driving circuit non-clock signal trace arrangement region is between the driving circuit clock signal trace arrangement region and the driving circuit arrangement region; and the driving circuit non-clock signal trace arrangement region is provided with a driving circuit non-clock signal trace therein; and the edge of the third orthographic projection region close to the display region is in the driving circuit non-clock signal trace arrangement region, and a width K1 of the fourth trench in the second direction satisfies:

$$K2 + K0 \leq K1 \leq 1.4 \times K2 + K0,$$

where K0 is a width of the second separation region in the second direction, and K2 is a width, in the second direction, of the frame sealing glue at a side close to the second separation region.

14. A display apparatus, comprising: the display panel of claim 10.

15. A display substrate, comprising:

a first base substrate comprising a sealing region and a display port region arranged along a first direction, wherein at least one first connection region and at least one second connection region arranged on a side of the at least one first connection region away from the sealing region are in the display port region, the at least one second connection region and the at least one first connection region are arranged at intervals, at least one first overlapping region is formed between the at least one second connection region and the at least one first connection region, and each of the at least one first overlapping region is a region between one of the at least one first connection region and one of the at least one second connection region and overlapping with the first connection region and the second connection region in the first direction;

a plurality of first connection terminals and a plurality of second connection terminals on the first base substrate, wherein the plurality of first connection terminals are in the at least one first connection region, and the plurality of second connection terminals are in the at least one second connection region; and a planarization layer on a side of the plurality of first connection terminals and the plurality of second connection terminals away from the first base substrate, wherein at least one first trench corresponding to the at least one first connection region and at least one second trench corresponding to the at least one second connection region are provided in the planarization layer; an orthographic projection of a bottom of each of the at least one first trench on the first base substrate covers a corresponding first connection region, an orthographic projection of a bottom of each of the at least one second trench on the first base substrate covers a corresponding second connection region; the planarization layer comprises: at least one first pattern corresponding to the at least one first overlapping region; an orthographic projection of the first pattern on the first base substrate overlaps with a corresponding first overlapping region, wherein a region where an orthographic projection of the planarization layer on the first base substrate is located is a second projection region;

for any one of the plurality of first connection terminals, a minimum distance from the first connection terminal to the second projection region along the first direction is greater than or equal to 50 μm;

for any one of the plurality of first connection terminals, a minimum distance from the first connection terminal to the second projection region along a second direction is greater than or equal to 1500 μm;

for any one of the plurality of second connection terminals, a minimum distance from the second connection terminal to the second projection region along the first direction is greater than or equal to 50 μm; and for any one of the plurality of second connection terminals, a minimum distance from the second connection terminal to the second projection region along the second direction is greater than or equal to 1500 μm, wherein the second direction intersects the first direction.

16. A display substrate, comprising:

a first base substrate comprising a sealing region and a display port region arranged along a first direction, wherein at least one first connection region and at least one second connection region arranged on a side of the at least one first connection region away from the sealing region are in the display port region, the at least one second connection region and the at least one first connection region are arranged at intervals, at least one first overlapping region is formed between the at least one second connection region and the at least one first connection region, and each of the at least one first overlapping region is a region between one of the at least one first connection region and one of the at least one second connection region and overlapping with the first connection region and the second connection region in the first direction;

a plurality of first connection terminals and a plurality of second connection terminals on the first base substrate, wherein the plurality of first connection terminals are in the at least one first connection region, and the plurality of second connection terminals are in the at least one second connection region; and a planarization layer on a side of the plurality of first connection terminals and the plurality of second connection terminals away from the first base substrate, wherein at least one first trench corresponding to the at least one first connection region and at least one second trench corresponding to the at least one second connection region are provided in the planarization layer; an orthographic projection of a bottom of each of the at least one first trench on the first base substrate covers a corresponding first connection region, an orthographic projection of a bottom of each of the at least one second trench on the first base substrate covers a corresponding second connection region; the planarization layer comprises: at least one first pattern corresponding to the at least one first overlapping region;

an orthographic projection of the first pattern on the first base substrate overlaps with a corresponding first overlapping region, wherein the first base substrate further comprises a second separation region; the second separation region and the sealing region are arranged in a second direction;

the sealing region comprises: a display region and a non-display region surrounding the display region, the non-display region comprising: a functional region between the display region and the second separation region;

the functional region comprises: a driving circuit arrangement region, a driving circuit clock signal trace arrangement region, and a display signal trace arrangement region, which are sequentially arranged away from the display region in the second direction;

the driving circuit arrangement region is provided with a gate driving circuit therein, the driving circuit clock signal trace arrangement region is provided with a plurality of driving circuit clock signal traces therein, and the display signal trace arrangement region is provided with a display signal trace therein;

the planarization layer is provided with a fourth trench corresponding to the second separation region therein, and an orthographic projection of the fourth trench on the first base substrate covers the second separation region; and a region where an orthographic projection of a bottom of the fourth trench on the first base substrate is located is a third orthographic projection region, and an edge of the third orthographic projection region close to the display region is between the driving circuit arrangement region and an edge of the display signal trace arrangement region close to the second separation region;

wherein the second direction intersects the first direction.

17. The display substrate of claim 16, wherein the edge of the third orthographic projection region close to the display region and the driving circuit clock signal trace arrangement region do not overlap with each other.

18. The display substrate of claim 16, wherein the edge of the third orthographic projection region close to the display region is in the display signal trace arrangement region.

19. The display substrate of claim 16, wherein the functional region further comprises: a driving circuit non-clock signal trace arrangement region;

the driving circuit non-clock signal trace arrangement region is between the driving circuit clock signal trace arrangement region and the driving circuit arrangement region; and the driving circuit non-clock signal trace arrangement region is provided with a driving circuit non-clock signal trace therein; and the edge of the third orthographic projection region close to the display region is in the driving circuit non-clock signal trace arrangement region.

* * * * *